United States Patent
Gomez Gutierrez et al.

(10) Patent No.: US 10,657,833 B2
(45) Date of Patent: May 19, 2020

(54) VISION-BASED COOPERATIVE COLLISION AVOIDANCE

(71) Applicant: Intel Corporation, Santa Clara, CA (US)

(72) Inventors: David Gomez Gutierrez, Tlaquepaque (MX); Leobardo Campos Macias, Guadalajara (MX); Rodrigo Aldana Lopez, Zapopan (MX); Rafael De La Guardia Gonzalez, Guadalajara (MX); Julio Zamora Esquivel, Zapopan (MX); Jose Parra Vilchis, Guadalajara (MX); David Arditti Ilitzky, Guadalajara (MX)

(73) Assignee: Intel Corporation, Santa Clara, CA (US)

( * ) Notice: Subject to any disclaimer, the term of this patent is extended or adjusted under 35 U.S.C. 154(b) by 213 days.

(21) Appl. No.: 15/828,134

(22) Filed: Nov. 30, 2017

(65) Prior Publication Data
US 2019/0051193 A1  Feb. 14, 2019

(51) Int. Cl.
*G08G 5/04* (2006.01)
*B64D 47/08* (2006.01)
(Continued)

(52) U.S. Cl.
CPC .......... *G08G 5/045* (2013.01); *B64C 39/024* (2013.01); *B64D 47/08* (2013.01); *G08G 5/0008* (2013.01);
(Continued)

(58) Field of Classification Search
CPC ....... G08G 5/045; B64C 39/024; B64D 47/08
See application file for complete search history.

(56) References Cited

U.S. PATENT DOCUMENTS

2012/0296497 A1  11/2012  Lee et al.
2017/0031369 A1   2/2017  Liu et al.
(Continued)

FOREIGN PATENT DOCUMENTS

DE   102018127144   6/2019
KR    20170074453   6/2017
(Continued)

OTHER PUBLICATIONS

"International Application Serial No. PCT US2019 020056, International Search Report dated Jun. 14, 2019", 3 pgs.
(Continued)

*Primary Examiner* — Michael D Lang
(74) *Attorney, Agent, or Firm* — Schwegman Lundberg & Woessner, P.A.

(57) ABSTRACT

Methods and apparatus are described for drone collision avoidance that includes extracting first feature information from an image. The image is captured from a first camera oriented in a direction. Second feature information is received from an external source. The second feature information is extracted from a second image of the environment captured by a second camera oriented in the direction. The first feature information and the second feature information are matched. A second local frame of reference of the second feature information is transformed to a first local frame of reference of the first feature information to determine a location of the external source. If a collision with the external source will occur is determined based on the location of the external source and a current flight trajectory.

26 Claims, 21 Drawing Sheets

(51) Int. Cl.
  *G08G 5/00* (2006.01)
  *B64C 39/02* (2006.01)
(52) U.S. Cl.
  CPC ......... *G08G 5/0021* (2013.01); *G08G 5/0069* (2013.01); *B64C 2201/127* (2013.01)

(56) References Cited

U.S. PATENT DOCUMENTS

| | | |
|---|---|---|
| 2017/0166325 A1 | 6/2017 | Gao et al. |
| 2018/0280780 A1 | 10/2018 | Nakao et al. |
| 2019/0037207 A1* | 1/2019 | Brockers .............. H04N 13/296 |
| 2019/0051194 A1 | 2/2019 | Campos Macias et al. |

FOREIGN PATENT DOCUMENTS

| | | |
|---|---|---|
| KR | 20170139326 | 12/2017 |
| WO | 2016154946 | 10/2016 |
| WO | 2019190692 | 10/2019 |

OTHER PUBLICATIONS

"International Application Serial No. PCT US2019 020056, Written Opinion dated Jun. 14, 2019", 6 pgs.
"U.S. Appl. No. 15/941,363, Non Final Office Action dated Oct. 3, 2019", 13 pgs.

* cited by examiner

VISION-BASED COOPERATIVE COLLISION AVOIDANCE

TECHNICAL FIELD

Embodiments described herein relate generally to collision avoidance for aerial vehicles, such as drones. Embodiments are implemented in hardware, software, or a mix of both hardware and software.

BACKGROUND

Current collision avoidance capabilities for area vehicles, such as drones, have various limitations. For example, collision avoidance methods may by limited to detecting large objects, such as walls, have a slow reaction time, and/or rely on 3D cameras for localizing nearby objects. These capabilities may not be applied for agent-to-agent collision avoidance. A typical scenario where existing methods fail is when two drones are flying in a collision path that is at 90 degrees. This may occur in open space or in areas such as hallways.

Another known method of collision avoidance relies on either external localization or simultaneous localization and mapping (SLAM) algorithms. This method, however, only works after the vehicles have a common map. In addition, real-time SLAM algorithms require powerful computers that are not typically available on drones. SLAM algorithms may also be unreliable in dynamic environments.

DETAILED DESCRIPTION

Figure 1:
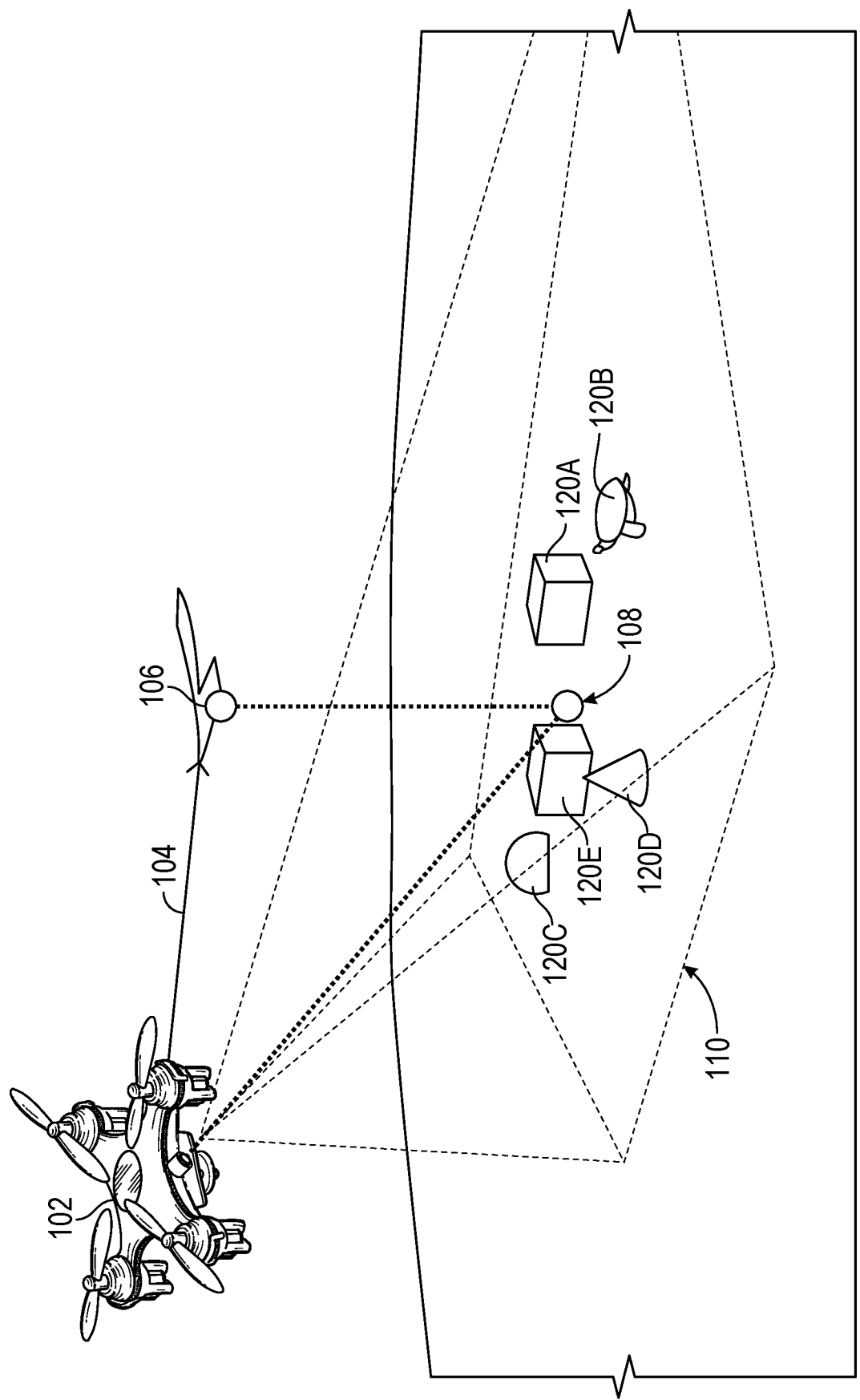
FIG. 1 illustrates capturing an image used for collision avoidance in accordance with an illustrative embodiment.

Many current applications of drones, such as precision farming, inspection, search and rescue, warehouse and inventory systems, may benefit from the interaction of multiple drones. For example, drones may reduce the time required to complete a job when using a single drone. In addition, there are many uses for drones to be in close proximity to one another. For example, multiple drones may operate within the same enclosed space or within a small outdoor area. Accordingly, there is interest for enabling autonomous flight. For safe autonomous flight, drones should avoid colliding with one another or other objects.

In an example, the disclosed collision avoidance procedures allow multiple drones to safely co-exist in cluttered environments, such as interiors or in low altitude flight. Thus, enabling new applications and an increase on efficiency by multi-drone systems. The proposed procedures are simpler and faster than current SLAM based approaches which require registering agents, e.g., drones, stationary objects, watercraft, etc. in a global map prior to being able to plan any coordinated action. A common reference frame and environment map is not needed for various disclosed collision avoidance techniques. The disclosed techniques improve over simple reactive methods based on detection and tracking of dynamic obstacles by allowing agents to anticipate potential collision avoidance situations and may be applied with monocular (in combination with inertial measurements), stereo or 3D cameras. Data associations between sensor observations acquired by different agents may be resolved, and used to determine the relative localization between two agents and respective neighbors.

In an example, a down-facing camera is oriented to ensure that two drones in a collision trajectory would detect the possible collision X/2 seconds in advance, localize and track each other to plan accordingly. X is an amount of time that may be calculated based on the maneuverability and/or reaction time of a drone. For example, X may be the amount of time a drone needs to move a certain distance to avoid a collision. In various embodiments, X may change based upon on the speed of the drone. Collision detection and avoidance may occur in situations where there is no line-of-sight between the drones, such as in hallways. In another example, the camera may be oriented upward. In various embodiments, the orientation of the cameras of the drones are the same. In addition, common features between two images are used to localize positions. Accordingly, any orientation and features within an image may be used for the disclosed collision avoidance techniques.

In various embodiments, the proposed reactive collision avoidance considers the position and velocity of a neighbor agent to create a virtual force. The virtual force and it reaction may be used by a low-level controller to maneuver the drone to avoid a collision with the neighbor agent. In some embodiments, a hierarchical trajectory planning algorithm considers static and dynamic objects in the environment to plan a collision-free trajectory by considering the trajectory of dynamic objects and other agents with higher priority as obstacles in 4D (3D space+time).

Various embodiments are directed to cooperative collision avoidance based on drone-to-drone communication of sparse visual features captured with a camera, such as with a pan/tilt camera. In embodiments, the pan/tilt camera is oriented in such a way that points to an area on the ground that the drone plans to overfly in the next X seconds. X may be, for example, 1, 3, 5, 15, 30 seconds. The value X may be set based on the maneuverability and reaction time of the drone. For example, if a drone needs 12 seconds to be able to move a distance equal to one, two, three, etc. of the largest dimension of the drone, then X may be set to 12 seconds. This assures that the drone is able to move out of the way of an approaching drone or obstacle. In an example, the value of X is set to be two times the time needed to move a particular amount of space. Setting the value to two or great times this amount accounts for an example where two drones are flying directly toward one another.

FIG. 1 illustrates capturing an image 110 used for collision avoidance in accordance with an illustrative embodiment. A drone 102 may be autonomously flying along a path 104 to a destination 106. The destination 106 will be reached at a calculated time based upon the drone's speed, expected speed along the path 104, and the path 104. When the drone 102 reaches the destination 106, the drone 102 will be directly over point 108. The image 110 includes multiple obstacles or features 120A-120E.

The obstacles 120A-120E may be used for another drone to determine the position of the drone 102. The drone 102 may share the image 110 or features relating to one or more of the obstacles 120A-120E with another drone. The other drone may use an image from its camera to determine the position of the drone 102. With the position and additional information such as the destination 106, path 104, etc., the other drone may change its path to avoid colliding with the drone 102.

Sharing images and/or feature information, allows two drones to "see" a common area in their planned trajectories identified by a number of feature corresponding in their respective views and will be able to localize each other. This allows either drone to determine if they are in a collision trajectory with one another. If a future collision based on the currently planned trajectories is determined a collision avoidance maneuver may be planned to avoid the collision. In addition, drones may exchange information about the trajectories of other drones or objects in their respective fields of view so that their presence may be considered when replanning a trajectory. Optionally, other cameras onboard could a drone may be used to verify the presence of other drones. In addition, a camera on a stationary object may also be used. In this example, a drone may determine if its trajectory will collide with the stationary object and may replan the trajectory as needed.

Figure 2:
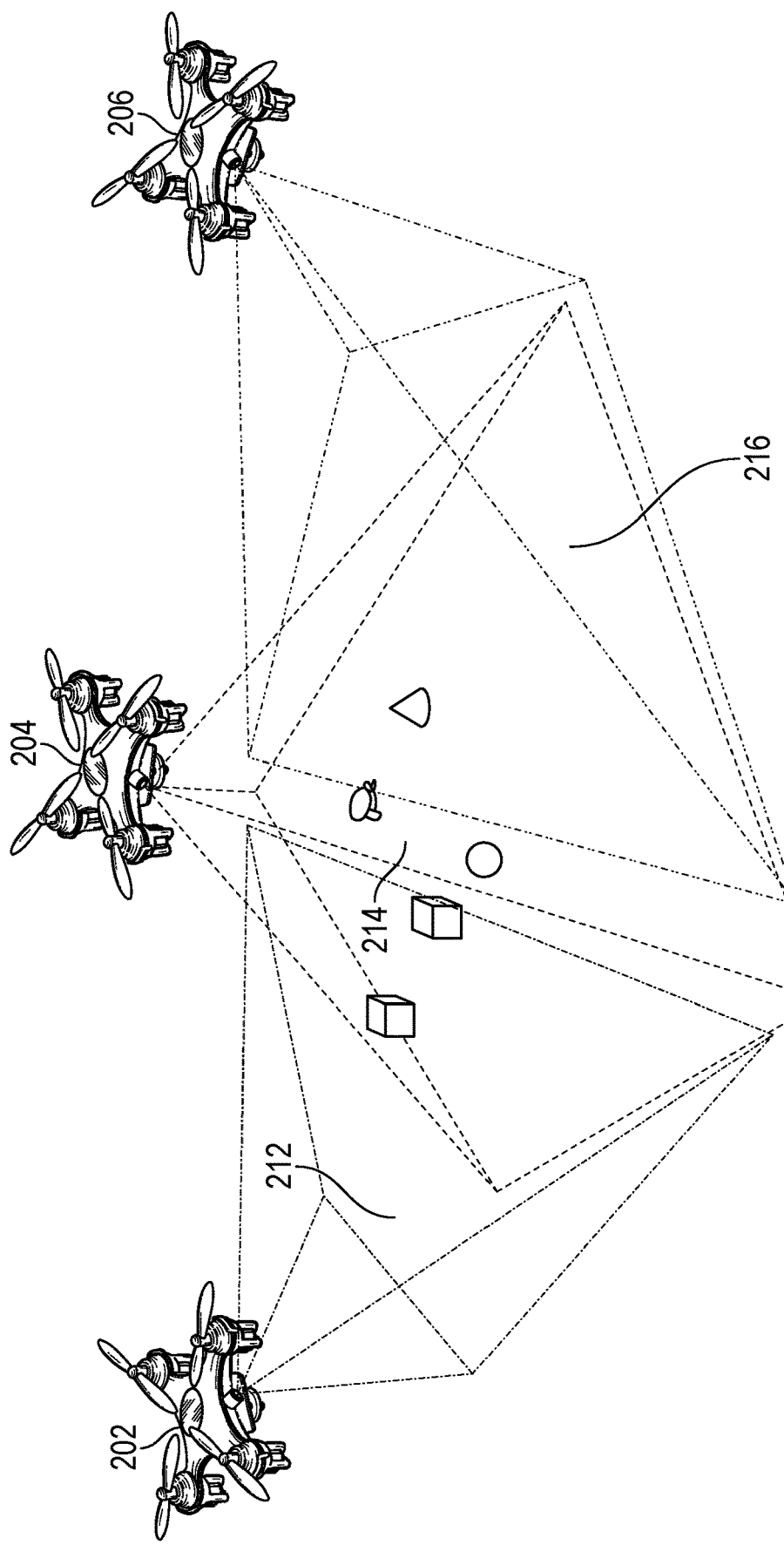
FIG. 2 illustrates three drones in one environment according to some embodiments.

In a dynamic environment that includes multiple drones, each drone may not be able to see or localize every other drone. Each drone, however, may share the location of its neighbors relative to its own frame of reference. In this way, one drone may be able to detect an unseen drone and plan accordingly, FIG. 2 illustrates three drones 202, 204, and 206 in one environment according to some embodiments. In the environment, an image 212 from a camera of a first drone 202 does not overlap with an image 216 from a third drone 206. Image 214 from a second drone 204, however, overlaps with both images 212 and 216. Accordingly, the first drone 202 will not be able to localize the position of the third drone 206 from the image 212 and the image 216. The second drone 204, however, may localize the position of both the first drone 202 and the third drone 206. The second drone 204 may share both its own location and the location of the third drone 206 relative to its own frame of reference with the first drone 202. The first drone 202 may then determine its location relative to the second drone 204 and then using the shared information, determine its location relative to the third drone 206.

One collision avoidance technique is based on placing a virtual force (which is a function of the position and velocity) on a neighbor drone's location and embedding the reaction to these forces in the trajectory tracking controller. In a second technique, each drone has access, via drone-to-drone communication, to the planned trajectories of other drones in their neighborhoods. With the information shared between drones, the plan of Agent B may be placed in Agent A's frame of reference. A possible future collision may be determined from the flight plan of Agent B and the flight plan of Agent A. If a future collision is detected, a hierarchical planner may be used by Agent A to update its intended trajectory.

FIGS. 3A-3F illustrate a cooperative collision avoidance technique according to some embodiments. The cooperative collision avoidance technique allows a fast neighbor localization and online planning and collision avoidance. In FIGS. 3A-3F, a first drone 302 has bi-directional communication with a second drone 304. Bi-directional communication is not required. For example, the second drone 304 may provide its data to the first drone 302 but not receive any data from the first drone 302. In this example, the first drone 302 would change its own trajectory to avoid the second drone 304. This allows the first drone 302 to not include transmitter functionality and transmitting hardware.

Returning to FIGS. 3A-3F both the first drone 302 and the second drone 304 are able to transmit its location data. Accordingly, this technique takes advantage of drone-to-drone communication that may include image data from a gimbal controlled down-facing camera. The position of the camera may be a function of the velocity, the maneuverability, and the drone's intended trajectory, in such a way that the camera is capturing an area on the ground that the drone plans to overfly in X seconds. For example, image 312 is captured using the camera from the first drone 302. Image 314 is captured using the camera from the second drone 304. In an embodiment, the image 312 or 314 itself may be transmitted. In another embodiment, extracted features may be transmitted rather than the entire image.

The features in each image 312, 314 are then extracted using known methods and broadcasted to neighbor drones, for example by using short range communication or a wireless network connection. By sharing these features, a neighbor drone may analyze feature matching, detect if part of the features is common (there is an image overlap) and use geometry techniques of multiples views (in this case views from different cameras) to localize the neighbor drone with respect to its own reference frame. Using multiple neighbor's views compute a relative velocity of a drone may be calculated. In another embodiment, a drone may communicate its velocity.

In addition, since geometry from different views may also be applied for a sequence of its own views, a drone may calculate its own velocity and extract the neighbor velocity in its own reference frame. This technique solves the problem of association of neighbor's location with neighbor's ID and/or communications channel which is a common problem in V2X communications where the infrastructure receives information but cannot distinguish the transmitting vehicle.

Figure 3A:
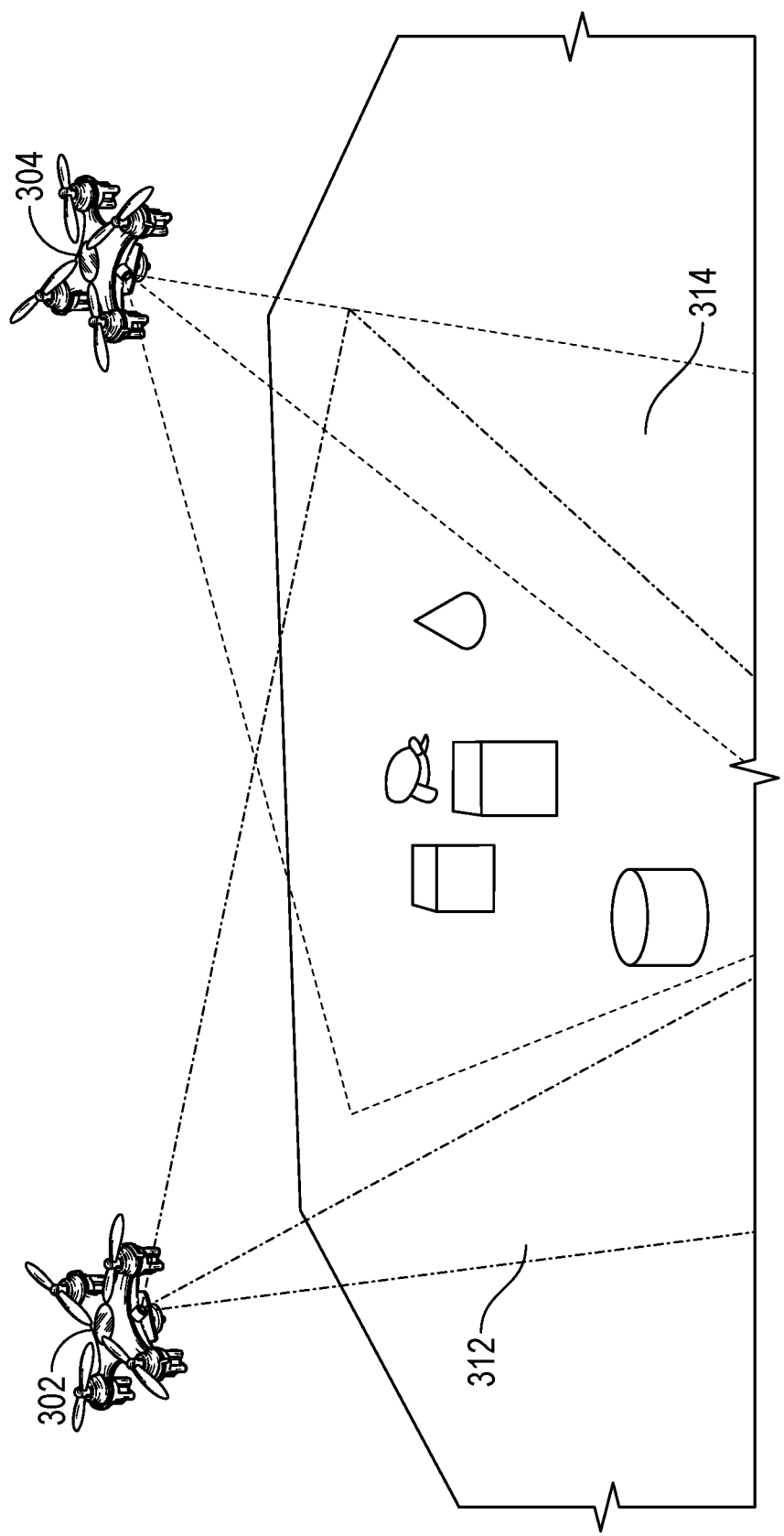
FIGS. 3A-3F illustrate a cooperative collision avoidance technique according to some embodiments.
Figure 3B:
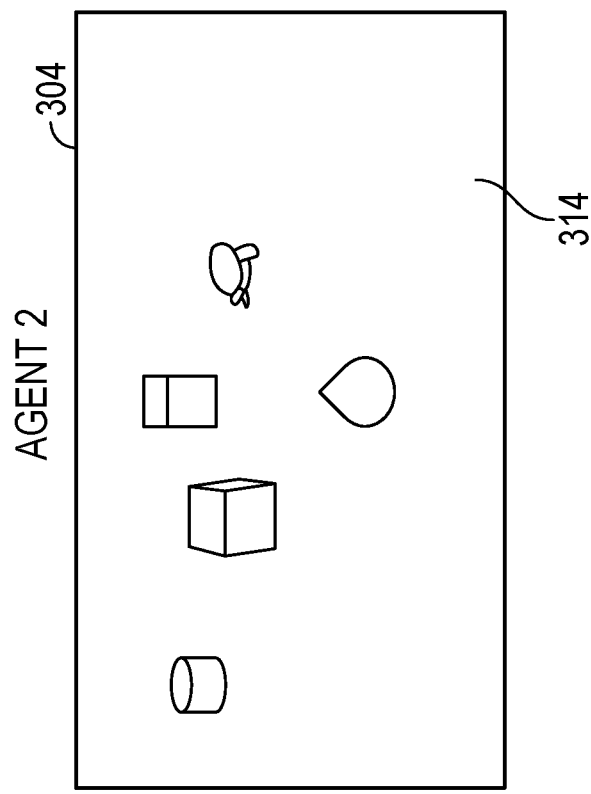
Figure 3B:
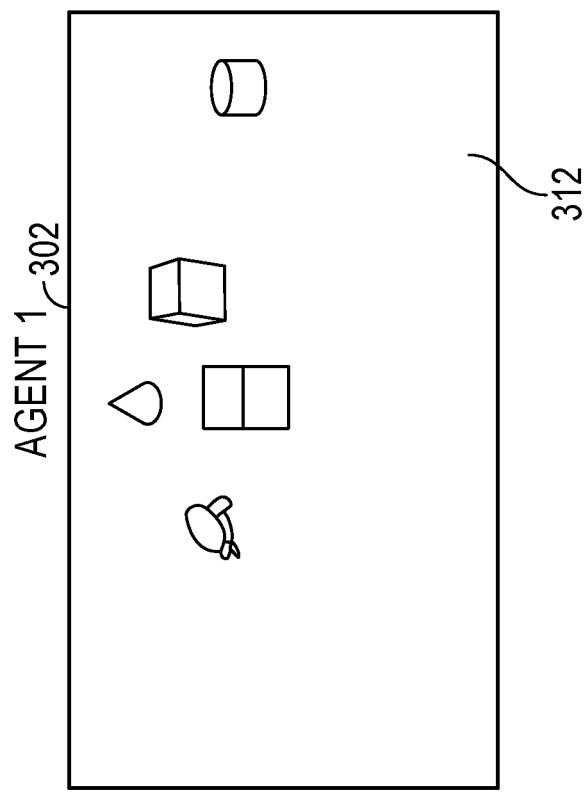
Figure 3C:
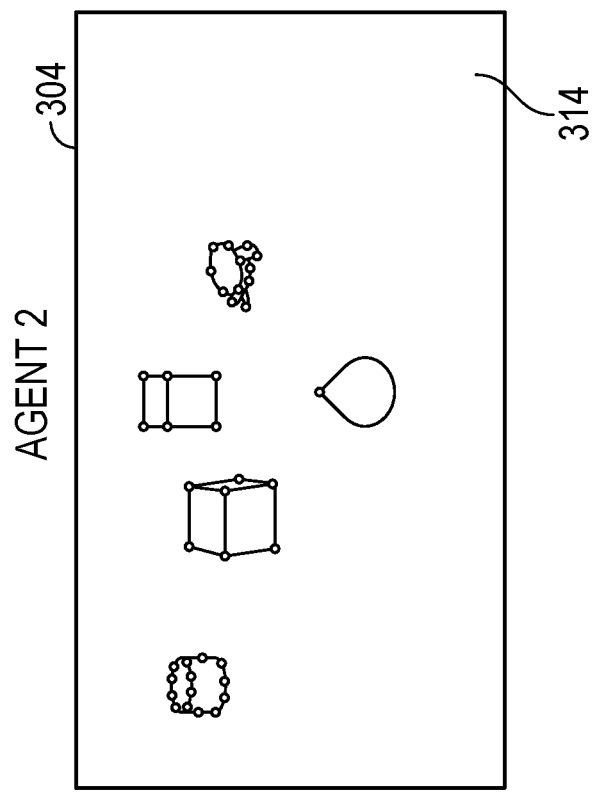
Figure 3C:
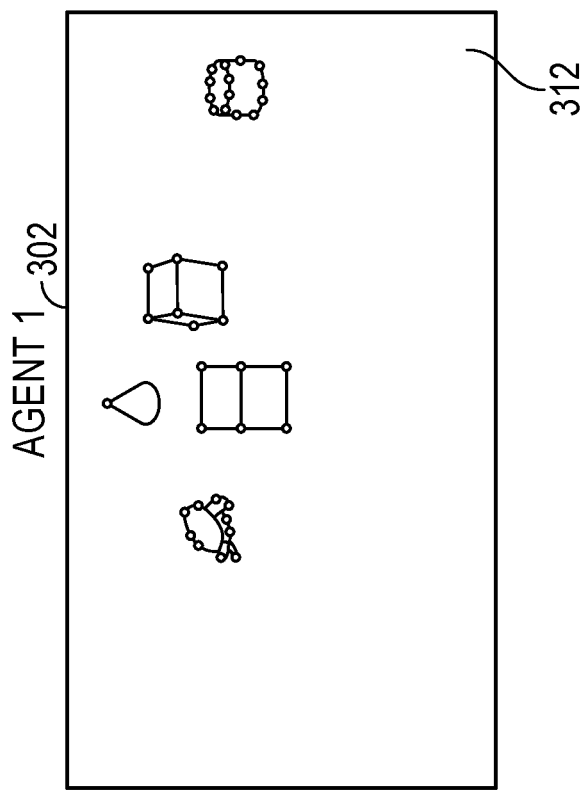
Figure 3D:
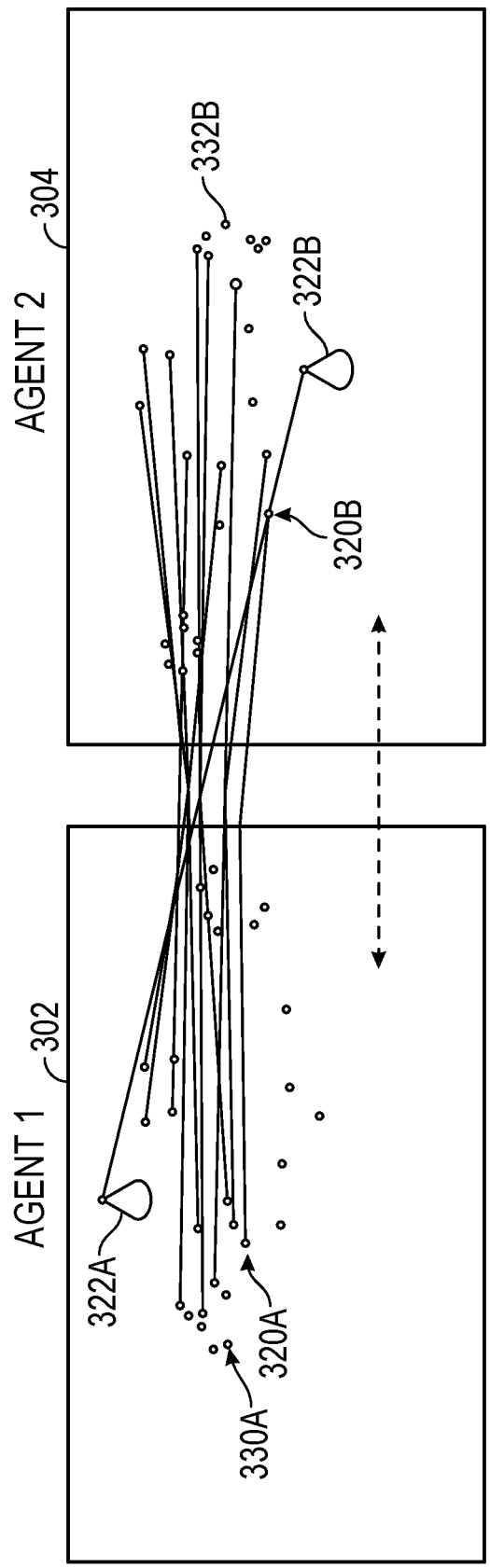

FIG. 3A shows the positions of the first drone 302 and the second drone 304 along with the images 312 and 314 that each of the drones 302 and 304 capture. The images 312 and 314 are centered where each drone will be at a particular time in the future. FIG. 3B shows the images 312 and 314 taken from the first drone 302 and the second drone 304 respectively. The images 312 and 314 include common objects. In the example in FIGS. 3A-3F, the camera on each of the drones 302 and 304 is pointed downwards. In other examples, the camera may be pointed upward, east, west, north, south, etc. Each of the drones 302 and 304 extracts the features from its image. FIG. 3C shows the features extracted from each of the images 312 and 314 as circles. This feature information may be transmitted to the other drone and other nearby drones or receivers. In addition, other information such as other drone locations, velocity, current flight path, the time when the drone will be over the center of the image, etc., may be transmitted. FIG. 3D shows the matching of features that were generated from the two images 312 and 314.

The features may be matched using known features matching techniques. For example, each feature may have a descriptor which may be obtained by feature extraction techniques such as scale-invariant feature transform (SIFT) or speeded up robust features (SURF). An example of a brute force way to match features is to take one feature from one image and compare that feature with all the features in the other image selecting the one with minimum distance or within a threshold. Another one example, is to use geometric constraints between two images, locate a feature in one image and look for it in the epipolar line defined in second image. Yet another option is to use a fast approximate nearest neighbor search (FLANN) based Matcher. To remove outliers a random sample consensus (RANSAC) algorithm may be used afterwards.

Using common features, each of the drones 302 and 304 is able to calculate a location of the other drone. In addition, the location paired with a flight route and/or speed, each drone is able to calculate if a collision will occur as the drone moves over the location pointed to by the camera.

Figure 3E:
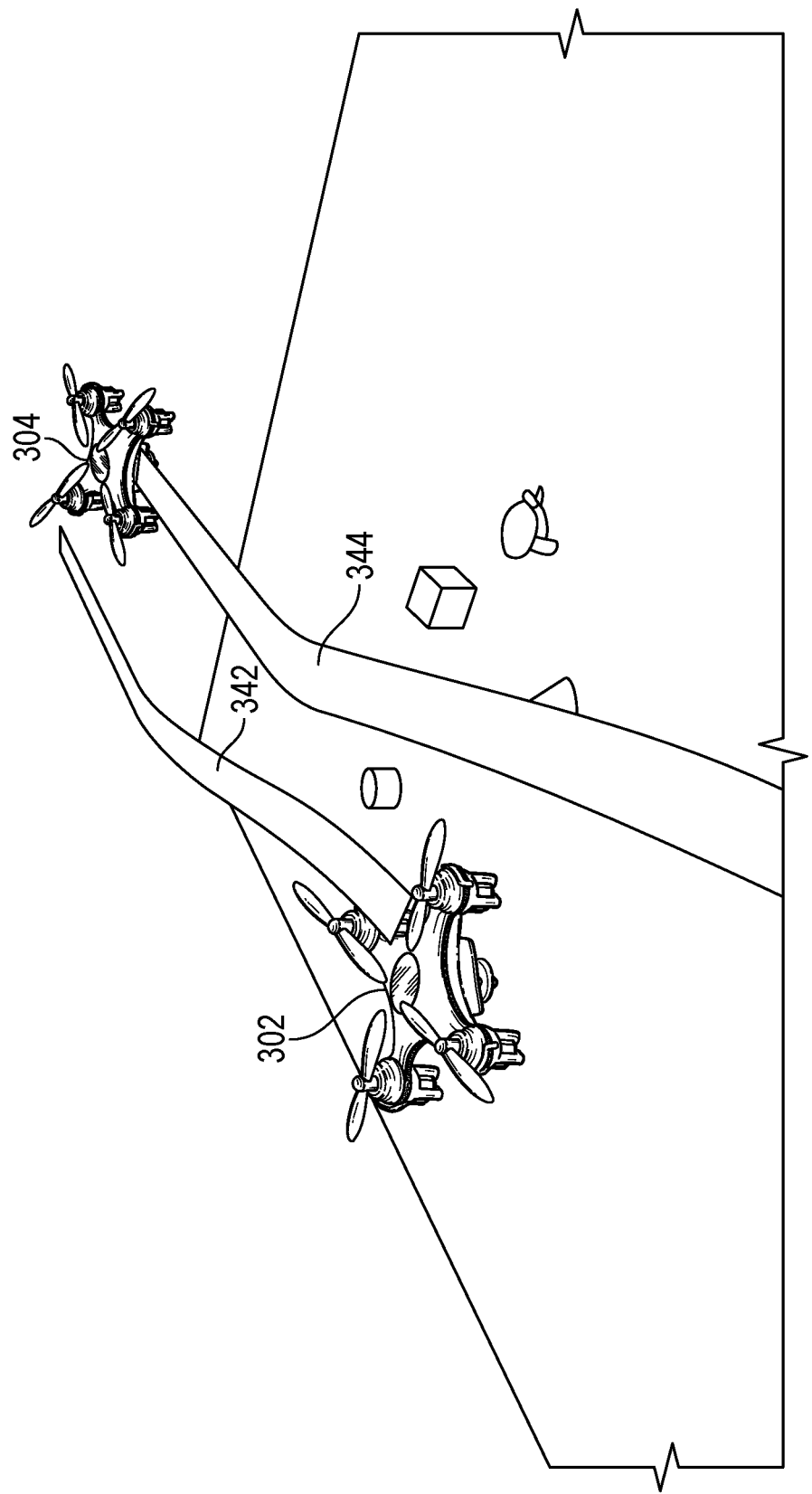

If a collision is predicted on the current flight paths of the drones 302 and 304, one or both flight paths may be changed. In an example, each drone 302 and 304 has a priority. This priority information may be shared and communicated with other drones. The drone with the lower priority alters its flight path to avoid the collision, while the drone with the high priority does not alter its flight path. This helps eliminate the drones both changing their flight paths but in such a way that the collision is not avoided. FIG. 3E shows the drones 302 and 304 on a collision course. The drone 304 has a flight path 344 and a higher priority than the drone 302. The drone 302 has a flight path, not shown, that is straight toward the drone 304. After sharing flight path and priority information, the drone 302 determines a collision is predicted with the drone 304 based on the current flight paths. Since the drone 302 has a lower priority, the drone 302 alters its flight path to a new flight path 342 which avoids the collision.

Figure 3F:
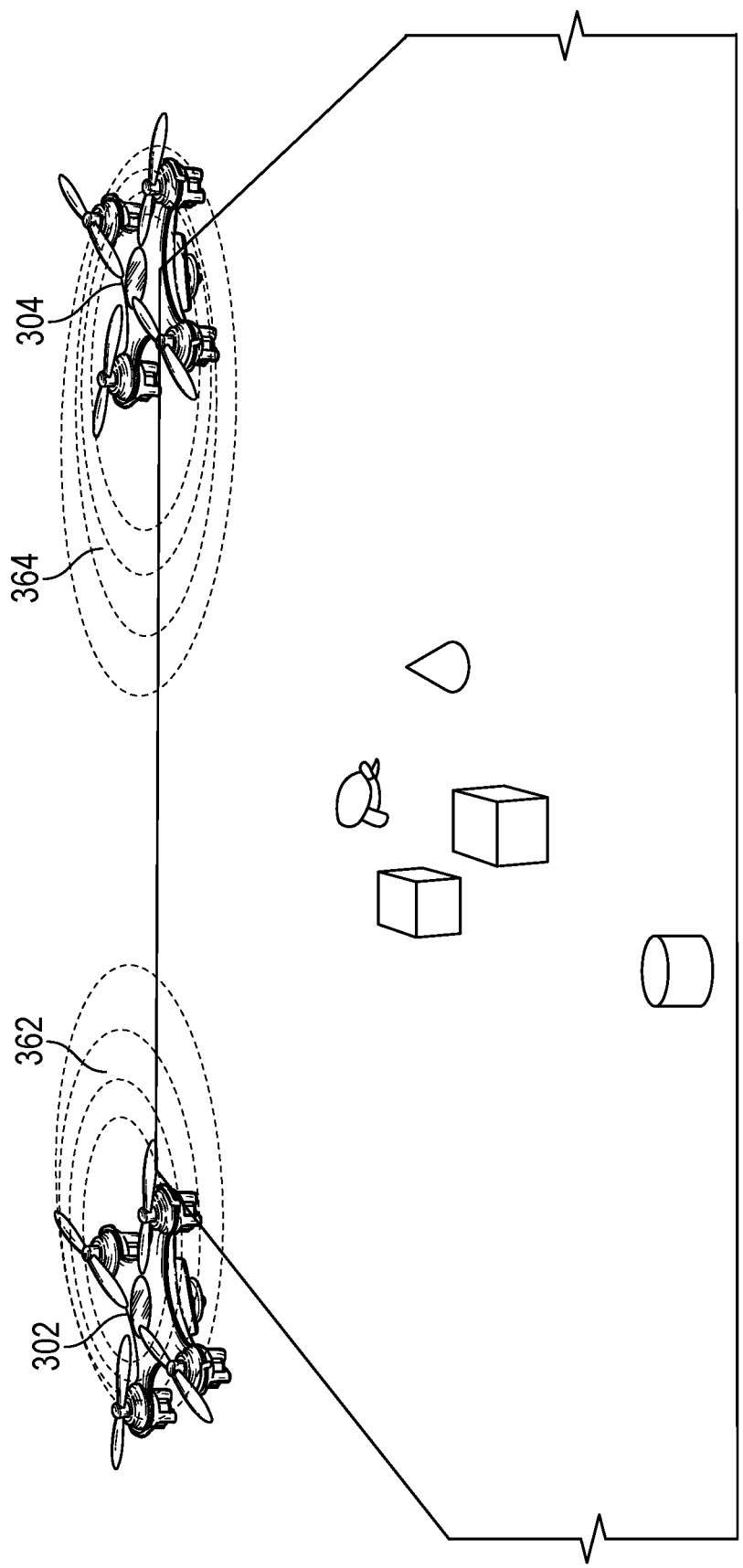

FIG. 3F illustrates another collision avoidance technique. This technique is a reaction collision avoidance that uses the velocity of the drones 302 and 304 to determine virtual forces 362 and 364. These virtual forces 362 and 364 indicate a space that the drones 302 and 304 may occupy in the future. In an example, the virtual forces 362 and 364 extend into the three-dimensions. The virtual forces 362 and 364 may be communicated to other drones which are then used to determine if a collision is predicted.

In one example, a stationary receiver receives the image or the features extracted from an image from one or more drones. The stationary receiver may then do the trajectory planning and collision determination. If a possible collision is detected, the stationary receiver may provide an updated flight route or flight instructions to avoid the collision. For example, a drone may be instructed to reduce or increase its speed to avoid the collision. As another example, a drone may be instructed to change its altitude to avoid the collision. In an example, the stationary receiver does the flight planning for multiple drones in the area, allowing for the drones to have less hardware and be lighter compared to having all the hardware needed to do onboard flight planning.

Down-Facing Camera Orientation

As noted above, cameras are used that each have the same orientation, e.g., downward, upward. The follow describes a down-facing camera orientation, but may also be used with upward-facing cameras. Suppose the drone is at a position $(x_0, y_0, z_0)^T$ and has a planned position $(x_p, y_p, z_p)^T$, X seconds in the future. Then the drone camera may be controlled to point towards $(x_p, y_p, z_g)^T$, where $z_g$ is the ground, e.g., 0. The drone 102, in FIG. 1, is pointing to its $(x_p, y_p, z_g)^T$ position 108. Let $\hat{u}$ be the unitary vector pointing from $(x_0, y_0, z_0)^T$ to $(x_p, y_p, z_g)^T$:

$$\hat{u} = \frac{(x_p - x_0, y_p - y_0, z_g - z_0)^T}{\sqrt{(x_0 - x_p)^2 + (y_0 - y_p)^2 + (z_0 - z_g)^2}}$$

Let $R(\psi, \phi, \theta) = R(t)$ be the rotation matrix defining the transformation from the initial orientation of the drone to the current orientation given $\phi, \theta, \psi$ (roll, pitch, yaw, the Euler angles).

$$R(\psi, \phi, \theta) = \begin{bmatrix} \cos\theta\cos\psi & -\cos\phi\sin\psi + \sin\phi\sin\theta\cos\psi & \sin\phi\sin\psi + \cos\phi\sin\theta\cos\psi \\ \cos\theta\sin\psi & \cos\phi\cos\psi + \sin\phi\sin\theta\sin\psi & -\sin\phi\cos\psi + \cos\phi\sin\theta\sin\psi \\ -\sin\theta & \sin\phi\cos\theta & \cos\phi\cos\theta \end{bmatrix}$$

Furthermore $\hat{f}_0$ denotes a unit vector pointing in the direction of the front of the drone from where it launched, and $\hat{f}(t)$ is the unit vector pointing in the direction of the front of the drone at a given time t. Note that $$\hat{f}(t) = R(t)\hat{f}_0.$$

Accordingly, there is a transformation matrix $R_G(\psi_G, \theta_G, \phi_G)$ that the gimbal may perform to orient the camera from pointing towards $\hat{f}(t)$ to $\hat{u}$. This relationship may be written as:

$$\hat{u} = R_G \hat{f}(t) = R_G R(t) \hat{f}_0$$

Figure 4:
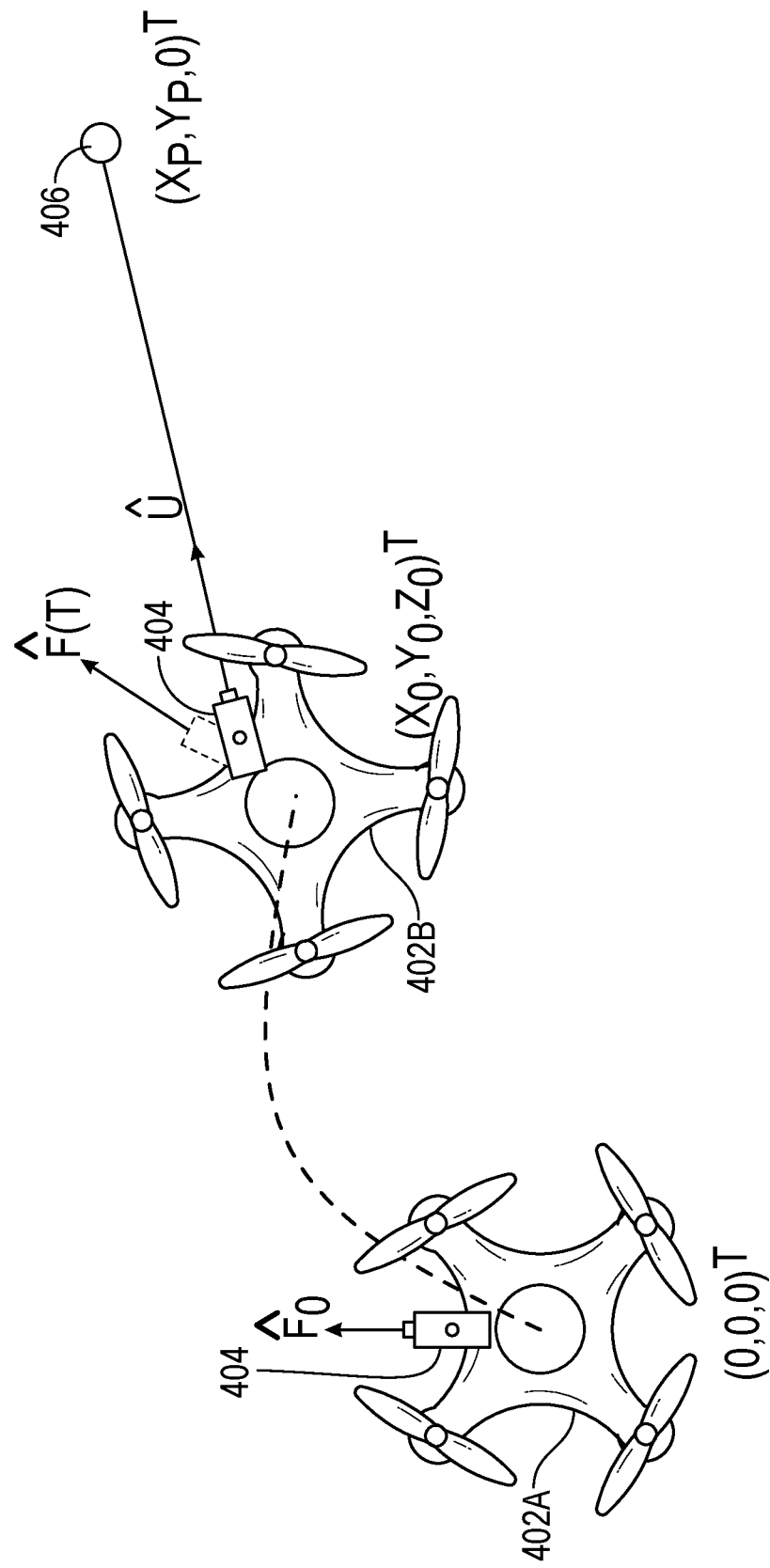
FIG. 4 illustrates a drone aligning its camera to point to a future position according to some embodiments.

FIG. 4 illustrates a drone aligning its camera to point to a future position according to some embodiments. At a first point in time, a drone 402A, has a camera 404 that is aligned with the $\hat{f}_0$ vector. At a future time T, the drone 402A calculates that it will be over a point 406. Accordingly, to capture a picture that includes the point 406, the drone 402A aligns its camera 404 towards the point 406. Using the transformation above, the drone 402A may calculate its rotation and other flight parameters. After such change in its relative position, the drone 402B now has its camera 404 pointing towards the point 406, which is along the vector $\hat{u}$.

Without loss of generality, $\hat{f}_0$ may be defined as the unit vector pointing in the x direction, therefore $\hat{f}_0 = (1, 0, 0)^T$. Note that that since $\phi, \theta, \psi$ are known from the sensors, then $\hat{u} = G \cdot R(t)(1,0,0)^T$ may be solved for the components of G, using known methods. Finally, from the components, the desired values for the gimbal camera $\psi_G, \phi_G, \theta_G$, may be obtained. For instance, if G have components $G_{ij}$, then:

$$\psi_G = \arctan\left(\frac{G_{21}}{G_{11}}\right)$$

$$\phi_G = \arctan\left(\frac{G_{12}}{G_{22}}\right)$$

$$\theta_G = -\arcsin(G_{31})$$

Geometry of Multiple Views

Figure 5:
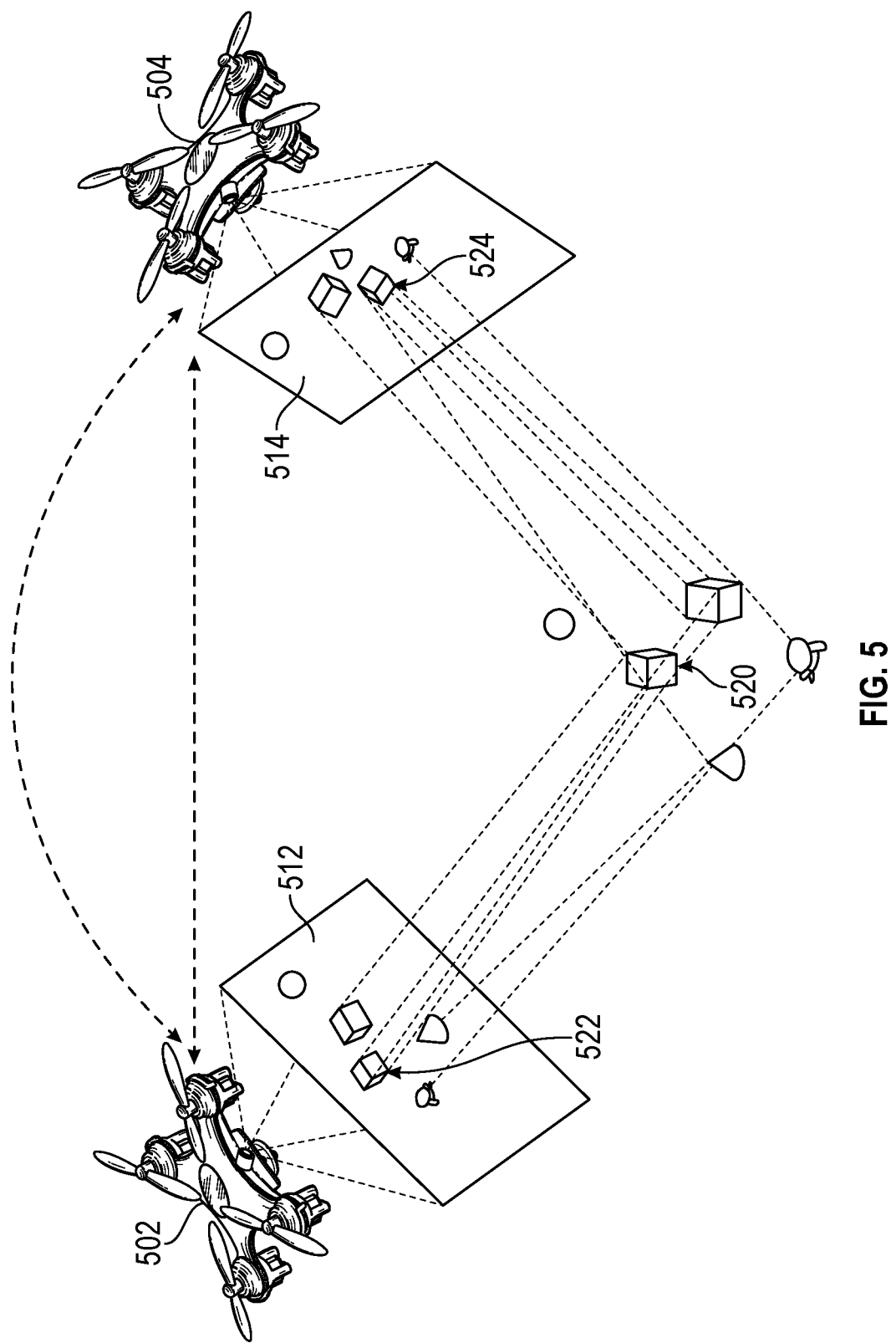
FIG. 5 illustrates two drones that may localize each other according to some embodiments.

FIG. 5 illustrates two drones 502 and 504 that are able to localize each other according to some embodiments. The drones 502 and 504 are able to localize each other by matching the features on their image with those shared by its neighbor. Each drone 502 and 504 may share the features on their own reference frame. In addition, the drones 502 and 504 may compute their relative velocity using successive image information. Since each drone 502 and 504 may compute its own odometry, the velocity vector of the drone 504 in the reference frame of the drone 502 may be obtained. An image 512 is taken by a camera on the drone 502. As described above, the camera may be pointed to a position over which the drone 502 will be located at a point in the future. An object 520 within the environment may be part of the image 512 as represented object 522. The same object 520, may also be part of an image 514 taken by the drone 504. An object 524 may captured within the image 514. Each drone 502 and 504 may do a feature extraction where features of the object 520 and other objects are obtained. This feature information may be shared between the drones 502 and 504. Accordingly, the drone 502 has its image 512, feature information from image 512, and feature information from image 514. The drone 502 may compare the feature information from both images 512 and 514 and match its version 522 of object 520 with a version 524 from the drone 504. In addition, the drone 502 may match other objects between the two images 512 and 514. This allows the drone 502 to determine a location of the drone 504. Traditionally, transformations from different views of the same drone may be used to compute visual-inertial odometry. As described though, views from different drones may be used to localize other drones and then use the locale and flight plans of other drones to plan an evasion maneuver as needed.

Neighbor Localization

Figure 6:
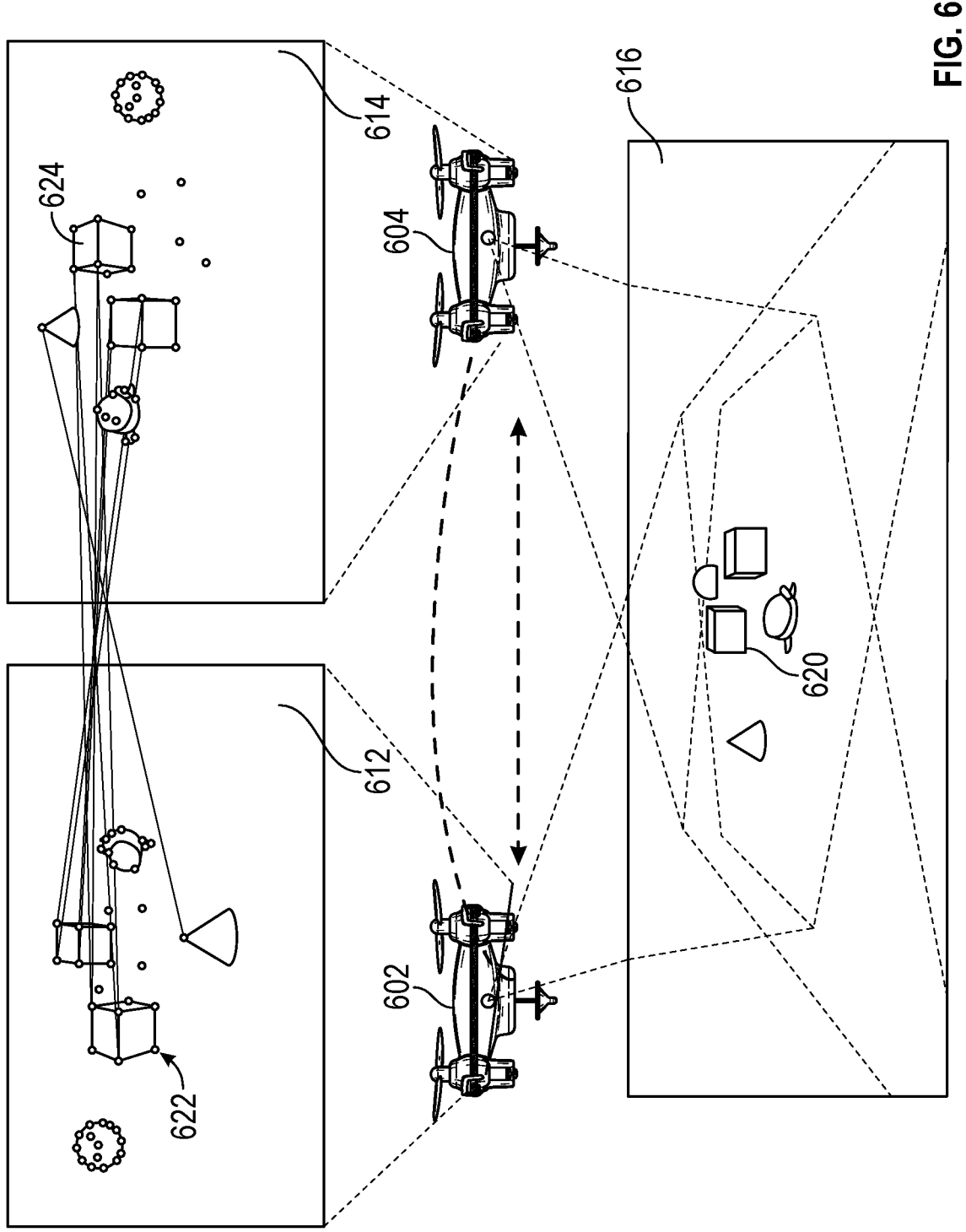
FIG. 6 illustrates neighbor localization according to some embodiments.

FIG. 6 illustrates neighbor localization according to some embodiments. Drones 602 and 604 orienting cameras at a location that they will fly over in the future as discussed above, insures that two drones in a collision path will compute a common area within images of the ground at least X/2 seconds in advance. The drones 602 and 604 may then capture images 612 and 614, respectively, of the environment 616. An agent A, the drone 602, may then share the information of the image and/or the features extracted from the image 612 to nearby neighbors. The images 612 and 614 captures some of the same objects, such as object 620. This object is represented as object 622 and object 624 in the images 612 and 614 respectively. The information allows a neighbor Agent B, the drone 604, to match information such as information relating to object 620 to detect image overlap and to compute a transformation (e.g., a homography) representing the translation and orientation of Agent A's reference frame with respect to Agent B's reference frame.

Figure 7:
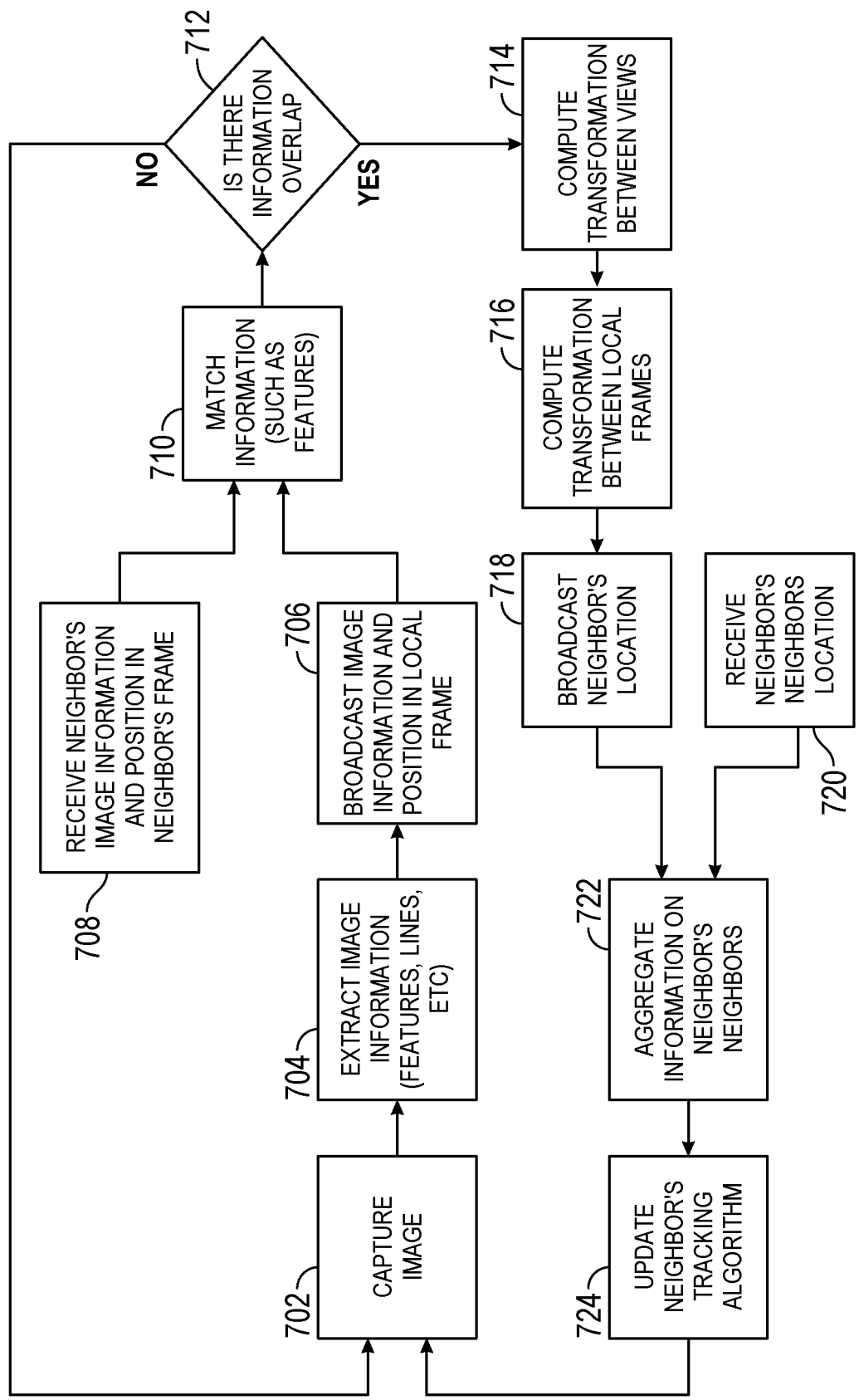
FIG. 7 is a flow chart for neighbor localization according to some embodiments.

FIG. 7 is a flow chart for neighbor localization according to some embodiments. This flow chart shows what one drone does to localize a neighbor. An image is captured by the drone at operation 702. Prior to capturing the image, the drone may calculate where the drone will be located at a future time and orient its camera to point to that location on the ground or on the ceiling. Image information, such as features, lines, etc., may then be extracted from the image at operation 704. The image information in the drone's local frame may be broadcast so that other nearby drones or receivers may receive the image information at operation 706. The drone may also receive a neighbor's drone image information and position within the neighbor's frame at operation 708. In an example, the image information may be from a stationary object or another drone. The image information from the drone's image and the received image information may be matched at operation 710. For example, the features may be compared and matched. At operation 712, an overlap within the image information is determined. If there is no overlap, then the drone determines there is no collision as the drone flies to its future location.

If there is an image overlap, there is a possibility that the drone will have a collision as it flies to its future location. A transformation between the two views is calculated at operation 714. The first transformation obtains the translation and rotation from one camera view to the other drone's camera view. This transformation transforms between the camera frame of the drone with the camera frame from the drone from which the image information was received. A transformation between the local frames is then done that allows the drone to use trajectory information regarding the other drone as well as any neighboring drone information at operation 716. The first transformation may be concatenated with the rotation and translation of the camera view with respect to its local frame to obtain the second transformation. This transformation may be used by one drone to localize the neighbor's neighbors in its local frame of reference. Accordingly, the transformations allow the drone to determine the location of the other drone relative to its frame.

At operation 720, the drone may receive locations of other drones that have been localized from the neighboring drone. This allows the drone to take into account flight trajectories of drones that do not have any image overlap. The information regarding the location of nearby drones, e.g., the neighboring drones that have image overlap with the current drone or image overlap with the neighboring drones. At operation 722, the locations of other drones are aggregated. The drone may then update its tracking algorithm with this information to determine if a collision is predicted at operation 724. Various collision algorithms are disclosed below. The drone may then capture another image and start the process over, such that the drone may continue to fly without colliding with other drones or obstacles.

Fusion of Visual-Based Estimation with Distance Measurement

If the features in the images are obtained from monocular cameras, without depth information, the relative position between drones may be computed up to an unknown scale factor which may be recovered. Taking advantage of the communications device used to share information between agents, the distance from receiver to transmitter may be measured. For example, a preamble may be included in the communication packets in order to achieve a RTT (round-trip time) protocol, which may be used to estimate the distance. Also, other methods such as RSS (received signal strength) may be used to determine the distance. Using ultra-wideband radios for accurate distance measurements is also possible.

Figure 8:
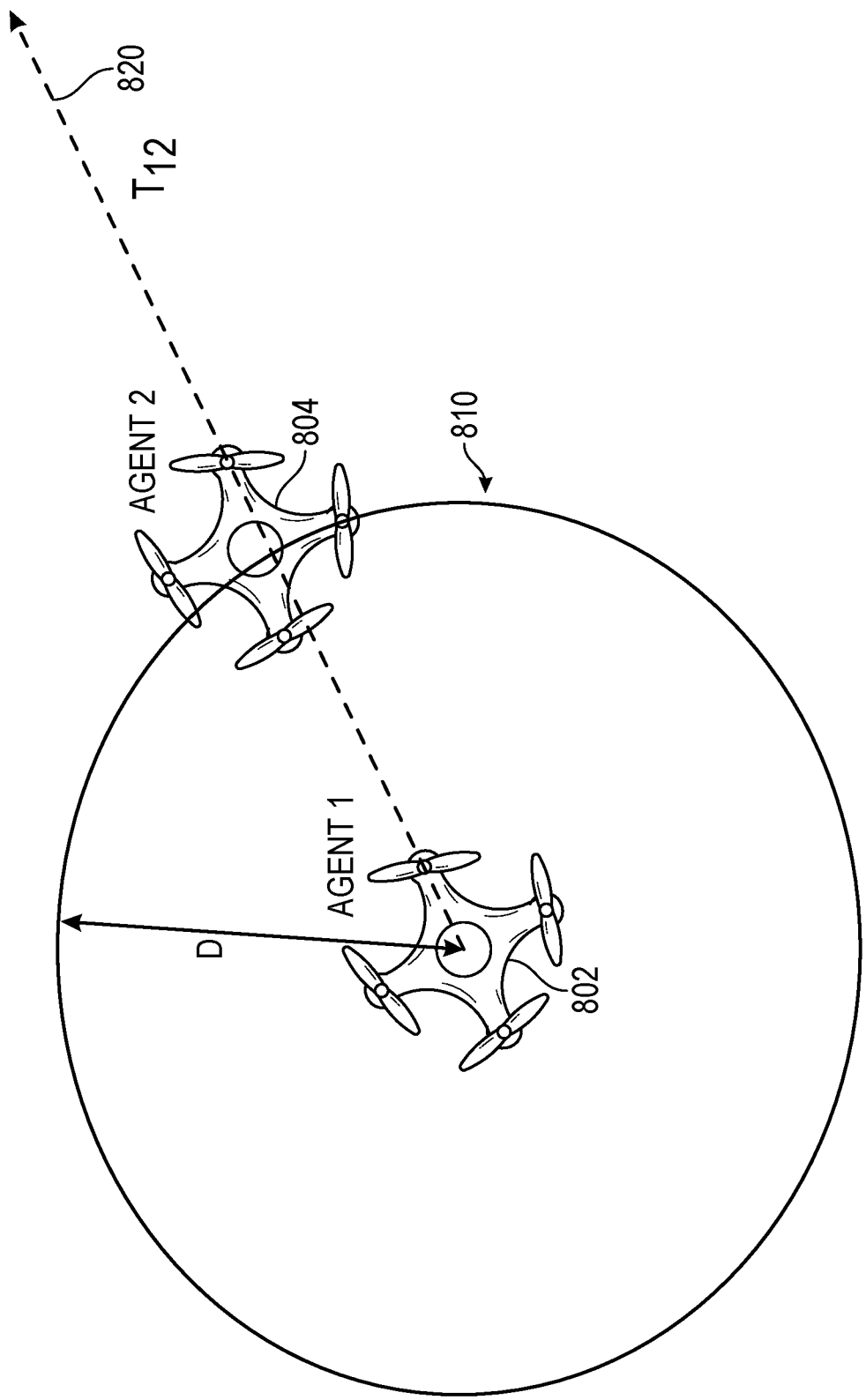
FIG. 8 illustrates determining a distance between two drones according to some embodiments.

FIG. 8 illustrates determining a distance between two drones 802 and 804 according to some embodiments. To fuse this information, a vector $t_{12}$ 820 between the two drones 802 and 804 defines a linear curve in space in which the other agent might be located. The vector $t_{12}$ may be obtained from the transformation described above in regard to the transformation 714. On the other hand, the distance to the drone 804 $d$ that may be obtained from the radio communication defines a sphere 810 in space in which the drone 804 might be. The intersection of the vector 820 and the sphere 810 is unique and corresponds to an estimate of the position of the drone 804.

Obtaining Neighbor and Trajectory Information from Drone 2 in the Reference Frame of Drone 1

Figure 9:
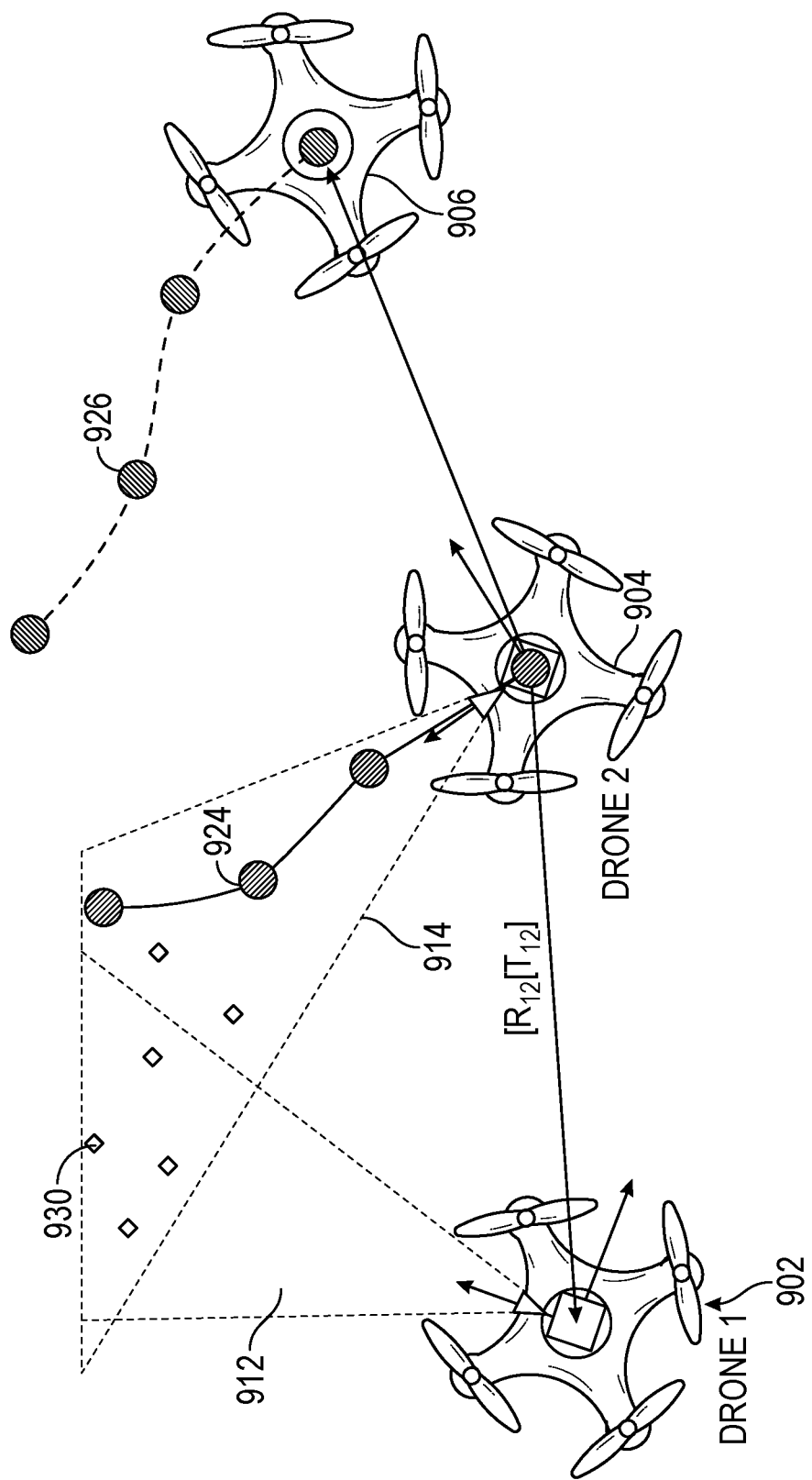
FIG. 9 illustrates sharing neighboring information according with some embodiments.

FIG. 9 illustrates sharing neighboring information according with some embodiments. A drone 902 may capture an image 912 and extract features from this image 912. For example, object 930 may be captured in the image 912 and features relating to the object 930 and other objects may be extracted from the image 912. These features may be shared with a drone 904. The drone 904 has taken its own image 914 that also captured the object 930. Features may be extracted from the image 914 may be shared with the drone 902. A third drone 906 may also take an image, not shown, that does not include any or enough features to match its image with the image 912 from the drone 902. The third drone 906 though may match with the drone 904, such that the drone 904 may be able to determine the location of the drone 906. The location of the drone 906 may then be shared with the drone 902 via the drone 904.

The drone 906 may share its flight plan 926 with the drone 904. The drone 904 may then share its flight plan 924 and the location and the flight plan 926 of the drone 906 with the drone 902. The drone 904 receives the flight plan of drone 906 relative to the reference frame of the drone 906. After calculating the location of the drone 906, the drone 904 may transform the flight plan 926 of the drone 906 into the reference frame of the drone 904. This transformed flight plan may be shared with the drone 902. Alternatively, the location of the drone 906 relative to the drone 904 may be shared with the drone 902, and the drone 902 may then do transforms using the location of the drones 904 and 906 to transform the flight plan 926 to its reference frame.

The drone 902, therefore, may be able to consider a flight plan 926 of the drone 906. A flight plan for a drone may be one or more three-dimensional points relative to the frame of the drone. The drone 902 may then consider the flight plans of both the drones 904 and 906 in determining its flight path and it there are any possible collisions. The drone 904 may share the location of the drone 906 relative to the drone 904 with the drone 902. The drone 902 may then obtain the transformation $[R_{12}|t_{12}]$, which transforms between the camera frame of the drone 902 to the drone 904. $R_{12}$ is the rotation between reference frames of the two camera views. The vector $t_{12}$ is the distance vector between the two drones 902 and 904. Then, the trajectory information of the drone 904 and the drone 906 may be transformed using $[R_{12}|t_{21}]$, which allows the drone 902 to know where the drone 906 is planning to fly.

Reactive Collision Avoidance Based on Virtual Forces

Figure 10:
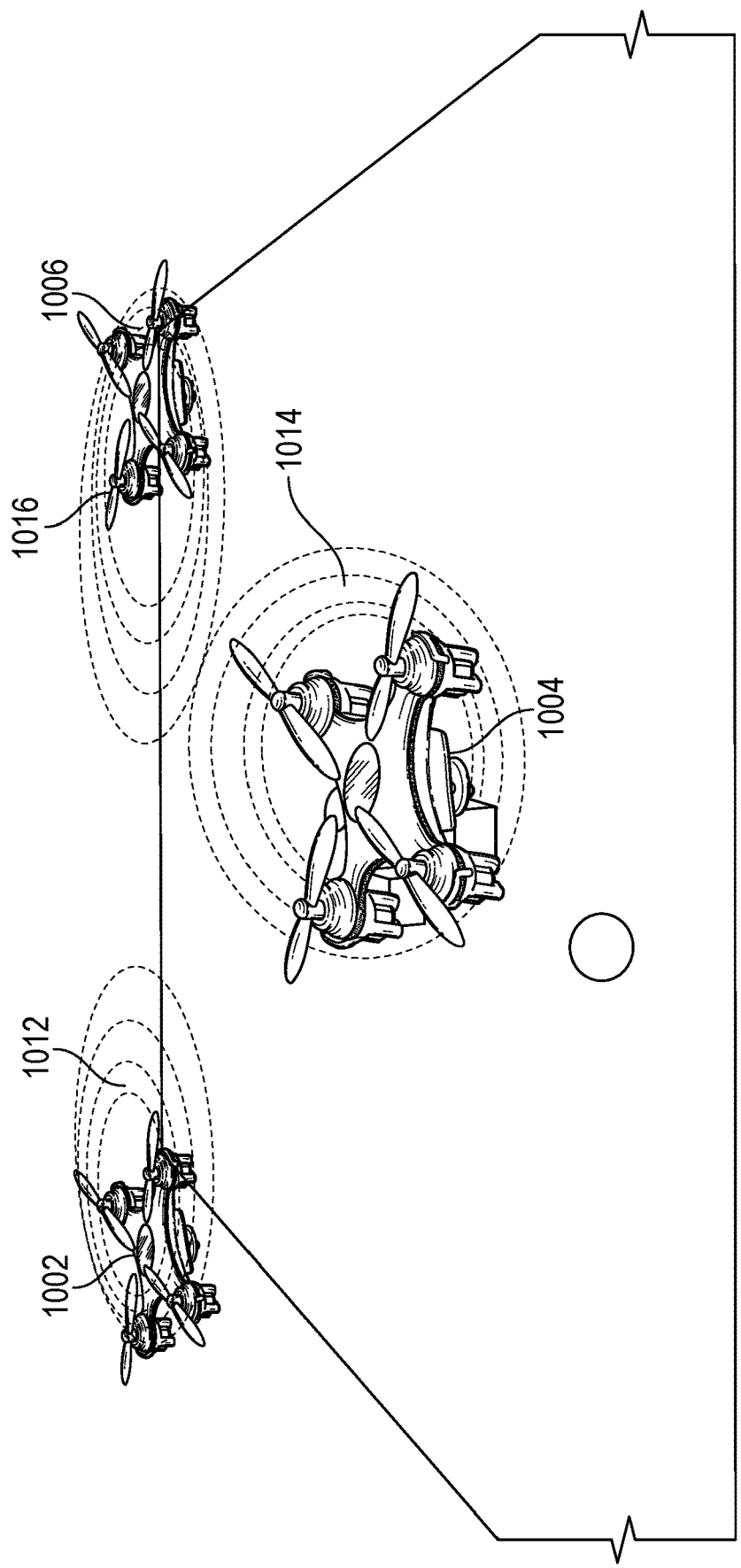
FIG. 10 illustrates using virtual forces to avoid collisions according to some embodiments.

FIG. 10 illustrates using virtual forces to avoid collisions according to some embodiments. Three agents, or drones, 1002, 1004, and 1006 are flying within an environment. Each of these drones 1002, 1004, and 1006 may have a virtual force, 1012, 1014, and 1016 respectively. A virtual force may be based on the velocity of a drone. In an embodiment, the virtual force may be visualized as a sphere. The virtual forces may also be used to adjust positions of drones to avoid collisions. The drones 1002 and 1004 have velocities with respect to the reference frame of the drone 1002 $\vec{v}_A$ and $\vec{v}_B$. As described above, the relative velocity $\vec{v}_{AB} = \vec{v}_B - \vec{v}_A$ may be obtained, as well as the relative position $\vec{R}_{AB}$. The virtual force may be based in the following formula:

$$\vec{F}_{AB} = \exp(-\lambda \vec{v}_{AB} \cdot \vec{R}_{AB}) \frac{\vec{R}_{AB}}{\|\vec{R}_{AB}\|^2},$$

where $\lambda$ is a design parameter that defines the size of the potential field, with a nominal/central value of 1. The direction of the force points away from the drone 1004 and its magnitude decreases inversely/quadratically with the distance as well as with the direction of the relative velocity due to the $\exp(-\lambda \vec{v}_{AB} \cdot \vec{R}_{AB})$ factor. This term decreases as the drone 1004 moves away from the drone 1002. This value is 1 when the drone 1004 moves parallel to the drone 1002. This term increases as the drone 1004 moves toward the drone 1002.

Virtual forces may be applied to any number of drones or other objects, so that the drone 1002 generates a virtual force 1014 and 1016 for each one of drones and/or other objects. This virtual force may then be added to the default position control that the drone is implementing. In an embodiment, there is a position control on top of an attitude control, where the former generates commands for the latter. These virtual forces may be added to the position control to generate the new attitude commands. The mixer takes the attitude commands and generates the respective power to be applied to the motors. The virtual forces, therefore, may affect the acceleration of the drone. This change generates a change in the reference of the attitude control, which changes the movement of the drone.

Figure 11:
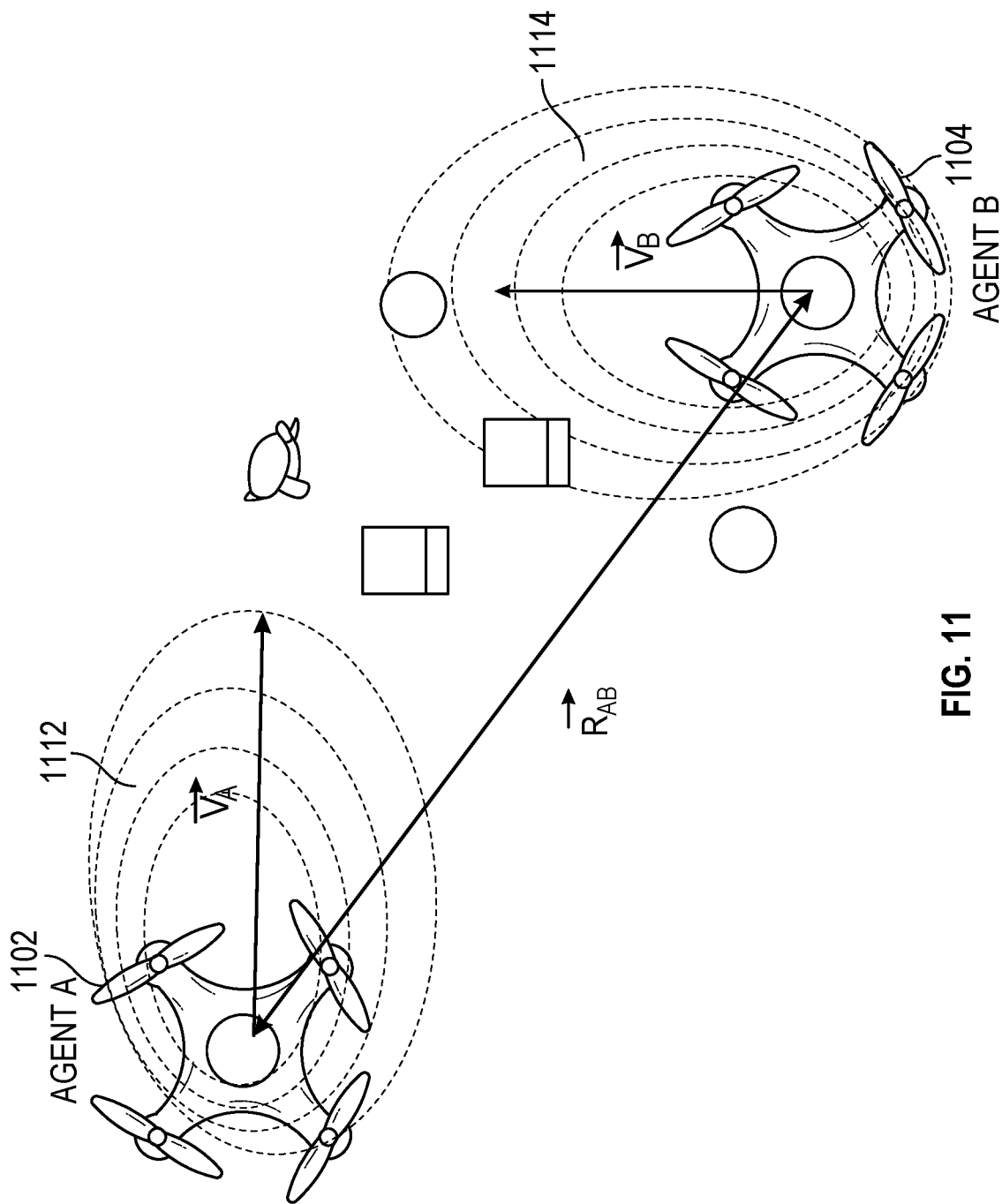
FIG. 11 illustrates an example of using virtual forces according to some embodiments.

FIG. 11 illustrates an example of using virtual forces according to some embodiments. A drone 1102 and a drone 1104 are flying such that without adjusting flight paths the drones 1102 and 1104 will collide at a future point. To avoid a collision, one or both drones 1102 and 1104 may use virtual forces to adjust its flight path. As described above, the velocity of both the drones 1102 and 1104 with respect to the reference frame of the drone 1102 are known or may be calculated. The relative velocity $\vec{v}_{AB}$ and position $\vec{R}_{AB}$ may then be calculated. Virtual force 1112 for the drone 1102 regarding the drone 1104 may be calculated as described above. This virtual force may then be used to update the flight path of the drone 1102 by adjusting the input to the attitude controller. The same calculations from the reference of the drone 1104 may be done to calculate a virtual force 1114. As the drones 1102 and 1104 fly towards one another, the drones 1102 and 1104 will repulse one another based on their calculated virtual forces 1112 and 1114. From an external vantage point, the drones 1102 and 1104 will look as if they repulse one another as they fly to close to one another. Each drone 1102 and 1104 will adjust its flight path to avoid colliding. As the drones 1102 and 1104 fly past one another, the virtual force values will decrease and each of the drones 1102 and 1104 will impact the flight path of the other drone less.

Figure 12:
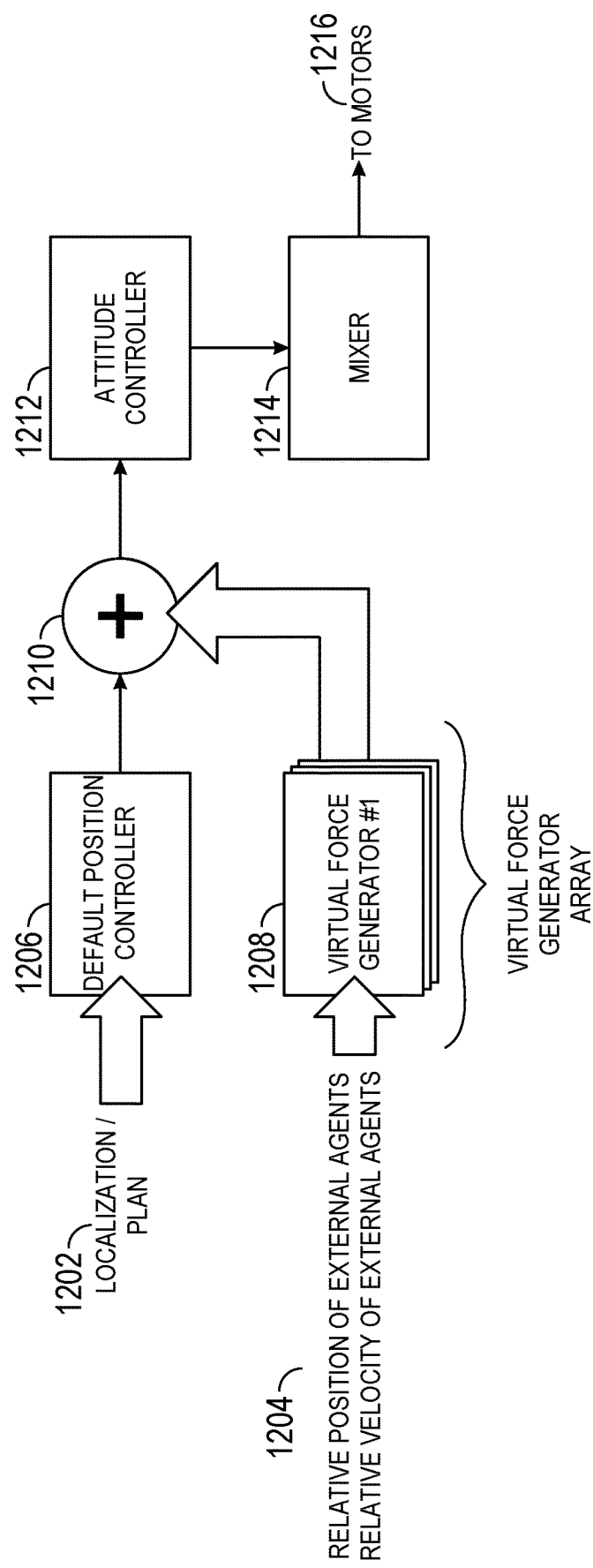
FIG. 12 is a flow chart for attitude adjustment using virtual forces according to some embodiments.

FIG. 12 is a flow chart for attitude adjustment using virtual forces according to some embodiments. A drone has a flight plan 1202 that is input into a position controller 1206. Without addition input, the position controller 1206 would provide a command to an attitude controller 1212.

The attitude controller 1212 provides commands to a mixer 1214 that determines and applies the appropriate power to motors 1216. Thus, a drone may fly along its planned route 1202. Without additional input, however, the drone may collide with other drones or objects. To avoid other drones, relative positions and relative velocities of a drone 1204 are provided to a virtual force generator 1208. A virtual force may be generated for the drones located nearby the drone. The virtual forces may then be added 1210 to the commands from the position controller 1206. Thus, a drone may have its flight deviate from the plan 1202 based upon the location and velocities of drones that are nearby, e.g., drones that may collide with the current drone.

Hierarchical Trajectory Planning with Collision Avoidance

Figure 13:
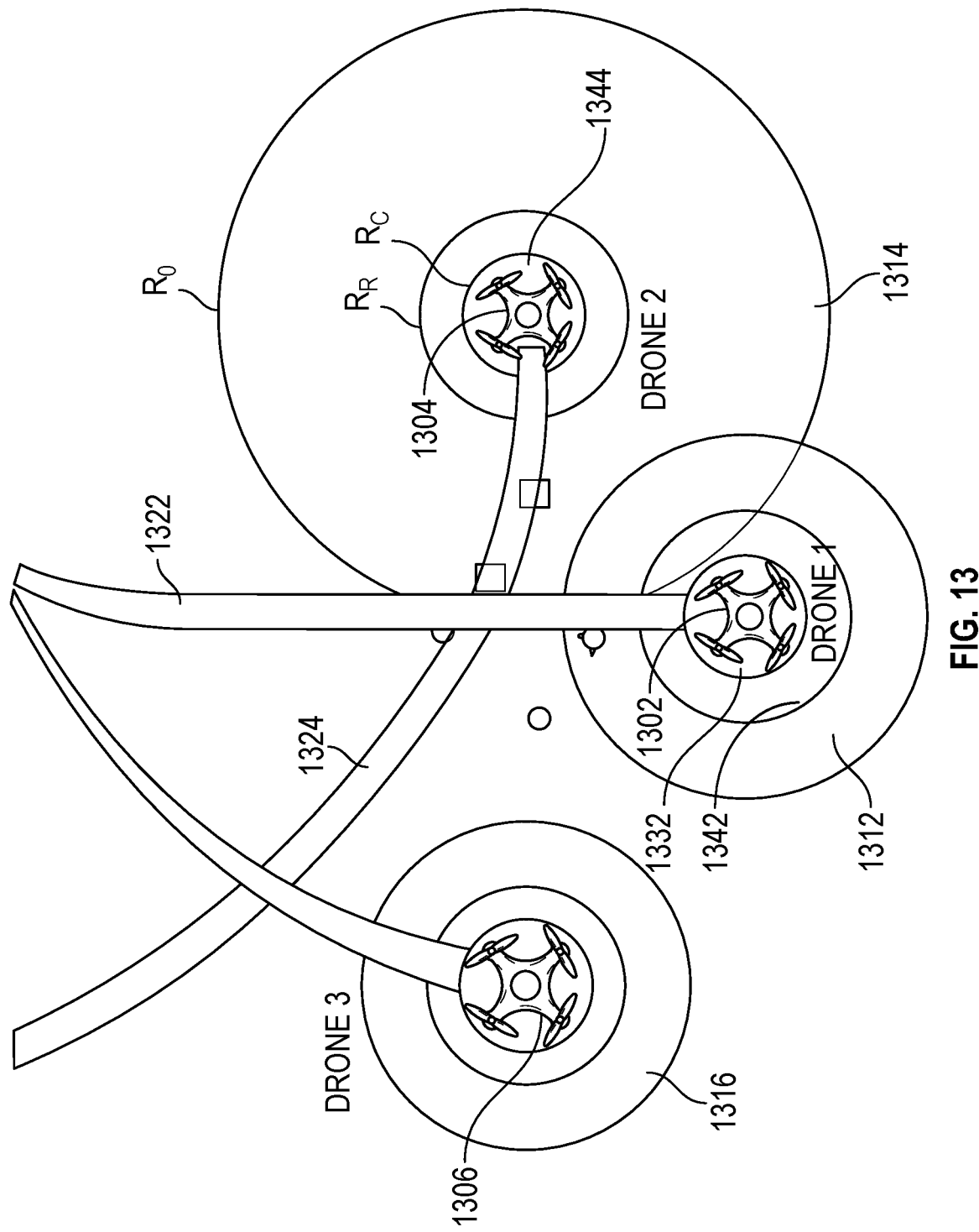
FIG. 13 illustrates hierarchical trajectory planning according to some embodiments.

FIG. 13 illustrates hierarchical trajectory planning according to some embodiments. Hierarchical trajectory planning may be used instead of the reactive collision avoidance or together with reactive collision avoidance. In an example, hierarchical trajectory planning may be used when a local minimum is detected. A local minimum may occur when other drones or obstacles block a drone from its destination. In these cases, a drone may stay in place until an obstacle moves or another trajectory planning such as hierarchical trajectory planning is used. Part or the complete trajectory of a drone may be transmitted to the neighbor drones in its own reference frame.

In an embodiment, each drone has three associated spheres. A collision sphere is a minimum sphere with a radius $r_c$ of that encloses the drone is centered on the center of mass of the drone. A replanning sphere encloses the collision sphere and has a radius of:

$$r_r = r_c + p_{12} + v_{12}(2h + t_r) + \frac{a_{12}(2h + t_r)^2}{2}$$

where, $r_c$ is the radius of the collision sphere, $p_{12}$, $v_{12}$, $\alpha_{12}$ are the relative position, velocity and acceleration of the center of mass with respect other drones respectively. h is the discretization time step and $t_r$ is the time it takes for the drone for computing a new trajectory. An observation sphere that encloses the observation sphere and its radius is given by:

$$r_o = r_r + v_{limit} t_o$$

where $t_o$ is the time the drone takes to receive the trajectory and align with its reference frame and $v_{limit}$ is the maximum velocity allowed for all drones in the environment.

Each drone 1302, 1304, and 1306 may calculate its spheres. For example, the drone 1302 calculates a radius of its replanning sphere 1312, its observation sphere 1332, and its collision sphere 1342. Each of the drones 1302, 1304, and 1306 calculate their relative positions. When the collision sphere 1342 of the drone 1302 intersects an observation sphere 1314 of the drone 1304, the drone 1302 sends its trajectory 1324 and its priority to the drone 1304. If the priority of the drone 1302 is higher than the drone 1304, then the reference frame of the drone 1304 is aligned with the reference frame of the drone 1302. The trajectory 1322 of the drone 1302 is compared with the trajectory 1324 of the drone 1304 in the aligned reference frames, to determine if the collision sphere 1342 of the drone 1302 intersects with a collision sphere 1344 of the drone 1304. If this occurs a collision is predicted and then the drone 1304 may re-plan its trajectory considering the trajectory of the drone 1302 as an obstacle to avoid the drone 1302.

Figure 14:
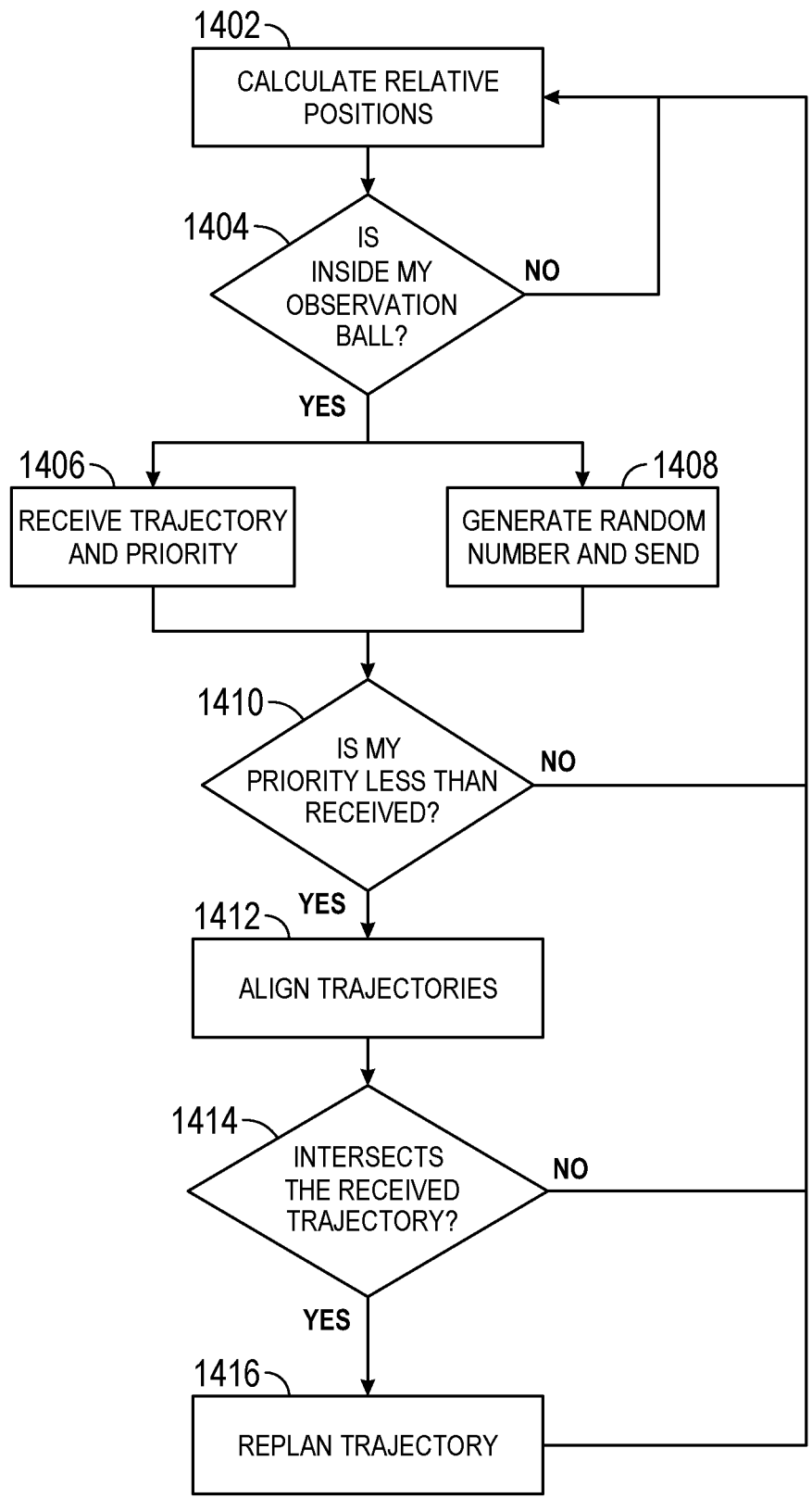
FIG. 14 is a flow diagram using hierarchical trajectory according to some embodiments.

FIG. 14 is a flow diagram using hierarchical trajectory according to some embodiments. At operation 1402, a drone calculates the relative position of its neighbors. The drone has received the position from its neighbors. The drone determines if any neighbor is located within its observation sphere at operation 1404. If there is no drone or obstacle in its observation sphere, the drone continues on its flight path without change and waits to redo the operation 1402. For example, a drone may determine if a neighbor is within its observation sphere on a time schedule, based on distance traveled, based on the number of neighbors, or a combination of these.

If there is a neighbor within its observation sphere, the drone calculates its priority if needed in operation 1408. In an example, the drone calculates its priority as a random number between 0 and 1 with uniform density. The drone may then transmit its priority and current planned trajectory so that its neighbor drone may receive the priority and the trajectory. If a drone determines that the neighbor drone has the same priority, the drone may calculate a new priority and transmit the new priority to the neighbor drone. The neighbor drone may also determine the drone is inside its observation ball and send its priority and trajectory. The drone, therefore, may receive its neighbor priority and current planned trajectory at operation 1406. The drone compares its priority with the priority of its neighbor at operation 1410. If the drone has a higher priority of the neighbor drone, the drone may continue with its trajectory as the neighbor drone will determine if a collision may occur and adjust its trajectory accordingly.

If the drone has a lower priority than its neighbor, the drone will adjust its trajectory is a future collision is detected. At operation 1412, the drone aligns its trajectory with the trajectory of its neighbor drone. Once the trajectories are aligned, the drone may determine if a future collision with the neighbor drone will occur at operation 1414. If there is no collision, then drone may continue with its flight plan unaltered. If there is a detected collision, then the drone may replan its trajectory to avoid the collision at operation 1416. There are known planning algorithms that are capable of generating a new trajectory within of a fraction of a second.

Figure 15:
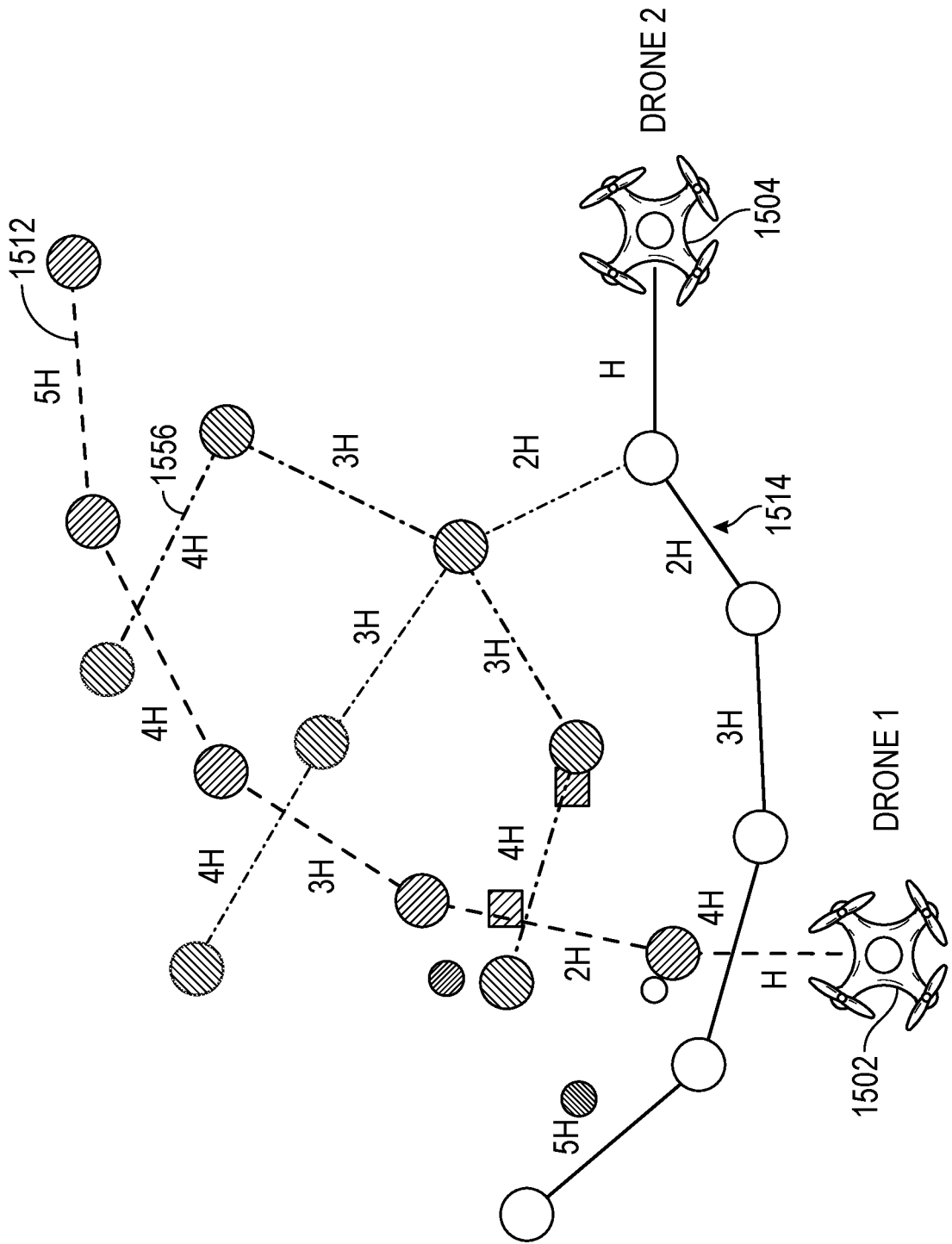
FIG. 15 shows trajectory planning based on sampling techniques according to some embodiments.

FIG. 15 shows trajectory planning based on sampling techniques according to some embodiments. The trajectory planning takes into consideration the trajectories of other drones. Two drones 1502 and 1504 are flying in the same environment and share trajectory information. The drone 1504 may receive the trajectory of the drone 1502. In this example, the drone 1504 will update its trajectory to avoid a possible collision with the drone 1502. The trajectory received by the drone 1504 that will replan its flight path is parametrized with respect to its discretization time step. For example, the drone 1504 receives the trajectory of the drone 1502 and parametrizes with the time step of the drone 1504. This is shown as the flight path 1512, which is essentially the current flight path of the drone 1502. Then, a sampling based method to generate the path planning may be used assigning a time step for each segment. If the time step of any generated segment is equal to the segment of the other drone, this segment is discarded since a collision will occur. In this example, a possible collision will occur at segment 1556, since the time segments are equal and intersect, e.g., 4 h, and cross. In this way, the proposed trajectory planning algorithm incorporates dynamic obstacles and considers the drones 1502 trajectory as "temporal obstacles", thus obtaining one or more collision free trajectories even in the presence of conflicting paths. For example, trajectory 1514 is one example that avoids the detected collision along segment 1556.

Example Machine Description

Figure 16:
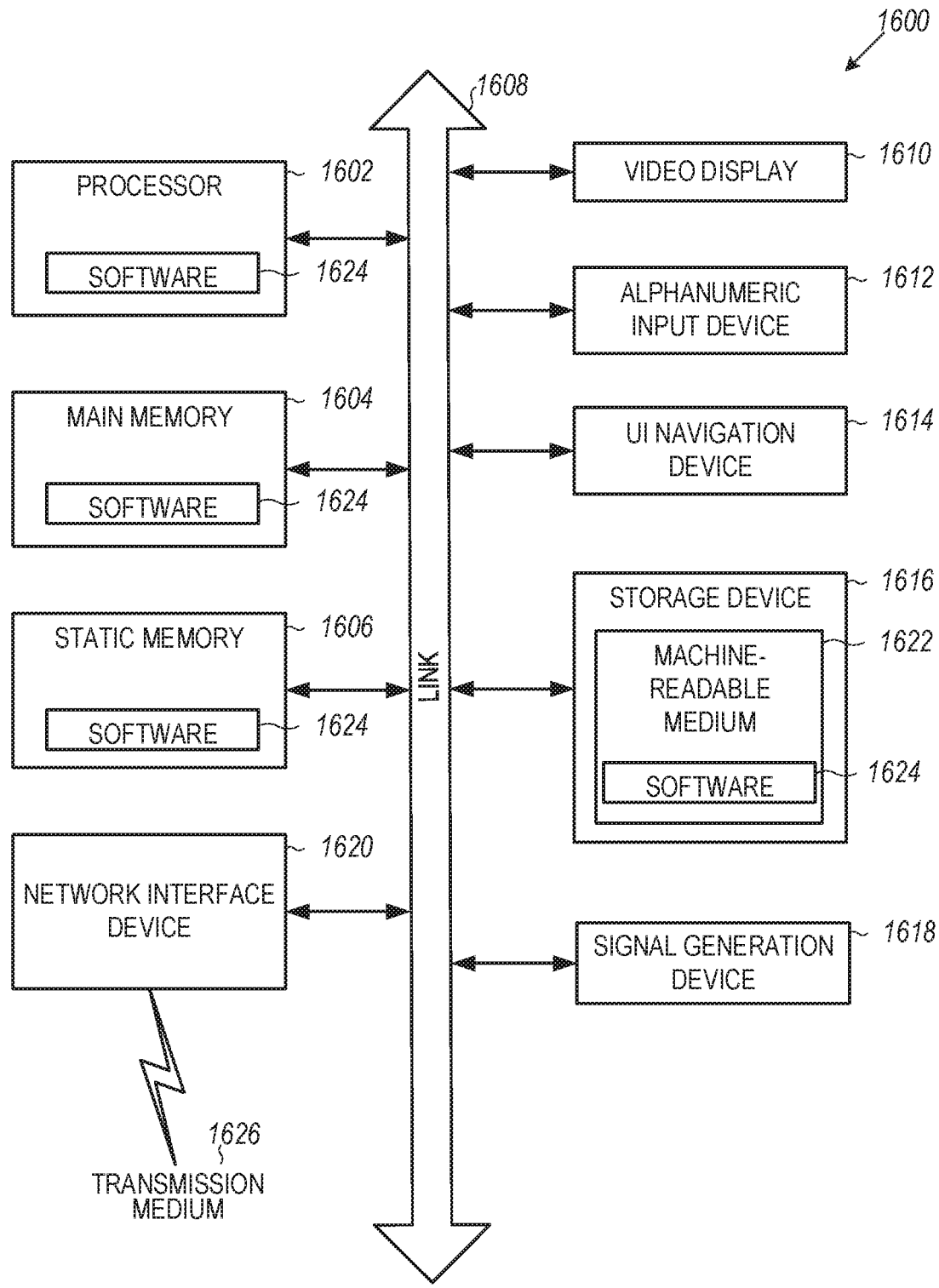
FIG. 16 illustrates a block diagram of computing device, within which a set or sequence of instructions may be executed to cause the device to perform examples of any one of the methodologies discussed herein.

FIG. 16 illustrates a block diagram of computing device 1600, within which a set or sequence of instructions may be executed to cause the device to perform examples of any one of the methodologies discussed herein. In alternative embodiments, the machine 1600 may operate as a standalone device or may be connected (e.g., networked) to other machines. In a networked deployment, the machine 1600 may operate in the capacity of a server machine, a client machine, or both in server-client network environments. In an example, the machine 1600 may act as a peer machine in peer-to-peer (P2P) (or other distributed) network environment. The machine 1600 may be a user equipment (UE), evolved Node B (eNB), Wi-Fi access point (AP), Wi-Fi station (STA), personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1600 may include a hardware processor 1602 (e.g., a central processing unit (CPU), a graphics processing unit (GPU), a hardware processor core, or any combination thereof), a main memory 1604 and a static memory 1606, some or all of which may communicate with each other via an interlink (e.g., bus) 1608. The machine 1600 may further include a display unit 1610, an alphanumeric input device 1612 (e.g., a keyboard), and a user interface (UI) navigation device 1614 (e.g., a mouse). In an example, the display unit 1610, input device 1612 and UI navigation device 1614 may be a touch screen display. The machine 1600 may additionally include a storage device (e.g., drive unit) 1616, a signal generation device 1618 (e.g., a speaker), a network interface device 1620, and one or more sensors, such as a global positioning system (GPS) sensor, compass, accelerometer, or other sensor. The machine 1600 may include an output controller 1628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1616 may include a machine readable medium 1622 on which is stored one or more sets of data structures or instructions 1624 (e.g., software) embodying or utilized by any one or more of the techniques or functions described herein. The instructions 1624 may also reside, completely or at least partially, within the main memory 1604, within static memory 1606, or within the hardware processor 1602 during execution thereof by the machine 1600. In an example, one or any combination of the hardware processor 1602, the main memory 1604, the static memory 1606, or the storage device 1616 may constitute machine readable media.

While the machine readable medium 1622 is illustrated as a single medium, the term "machine readable medium" may include a single medium or multiple media (e.g., a centralized or distributed database, and/or associated caches and servers) configured to store the one or more instructions 1624.

The term "machine readable medium" may include any medium that is capable of storing, encoding, or carrying instructions for execution by the machine 1600 and that cause the machine 1600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1624 may further be transmitted or received over a communications network 1626 using a transmission medium via the network interface device 1620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques. The term "transmission medium" shall be taken to include any intangible medium that is capable of storing, encoding or carrying instructions for execution by the machine 500, and includes digital or analog communications signals or other intangible medium to facilitate communication of such software.

ADDITIONAL NOTES AND EXAMPLES

Example 1 is an apparatus for a drone collision avoidance, the apparatus comprising: processing circuitry to: extract first feature information from an image, the image captured from a first camera oriented in a direction; receive second feature information from an external source, wherein the second feature information is extracted from a second image of the environment captured by a second camera oriented in the direction; match the first feature information and the second feature information; transform a second local frame of reference of the second feature information to a first local frame of reference of the first feature information to determine a location of the external source; and determine if a collision with the external source will occur based on the location of the external source and a current flight trajectory.

In Example 2, the subject matter of Example 1 includes, wherein a collision with the external source is determined and wherein the processing circuitry is further configured to alter the current flight trajectory based on the collision.

In Example 3, the subject matter of Examples 1-2 includes, wherein the external source is a second drone.

In Example 4, the subject matter of Examples 1-3 includes, wherein the external source is a stationary object.

In Example 5, the subject matter of Examples 1-4 includes, a transmitter to broadcast the first feature information.

In Example 6, the subject matter of Examples 1-5 includes, wherein the processing circuitry is further configured to receive a location of a third source, the third source does not have overlapping features with the first feature information, and wherein the processing circuitry is further configured to: determine a collision with the third source will occur based on the location of the third source and the current flight trajectory; and alter the current flight trajectory based on the determination that the collision with the third source will occur.

In Example 7, the subject matter of Examples 1-6 includes, wherein the processing circuitry is further configured to receive trajectory information of the external source from the external source.

In Example 8, the subject matter of Example 7 includes, wherein the processing circuitry is further configured to: determine a relative velocity of the external source based on the trajectory information of the external source; determine a virtual force based on the relative velocity of the external source; add the virtual force to a position based on the current flight trajectory to create an attitude controller input; and provide the attitude controller input to an attitude controller, wherein the virtual force changes acceleration of the drone from an acceleration of the current flight trajectory.

In Example 9, the subject matter of Examples 7-8 includes, wherein the processing circuitry is further configured to receive external source priority information from the external source, and wherein to determine if a collision with the external source will occur the processing circuitry is configured to: determine an observation sphere of the external source based on the location of the external source; determine a collision sphere of the drone based on a current location of the drone; determine the observation sphere of the external source intersects the collision sphere of the drone; align current flight trajectory and the flight trajectory of the external source based on the intersection of the observation sphere of the external source and the collision sphere of the drone; and determine a collision between the drone and the external source will occur based on an intersection of the aligned trajectories.

In Example 10, the subject matter of Examples 7-9 includes, wherein to determine if a collision with the external source will occur the processing circuitry is configured to: determine first locations of the drone based on the current flight based on the current flight trajectory for a plurality of time points; determine second locations of the external source based on the trajectory information of the external source for the plurality of time points; and determine a collision will occur if paths between consecutive points from the first locations and the second locations cross at a same time point.

In Example 11, the subject matter of Examples 1-10 includes, wherein the direction is upward.

In Example 12, the subject matter of Examples 1-11 includes, wherein the direction is downward.

Example 13 is a machine-implemented method for a drone collision avoidance, the method comprising: capturing, using a camera, an image of an environment, wherein the camera is oriented in a direction; receiving, using a receiver, second feature information from an external source, wherein the second feature information is extracted from a second image of the environment captured by a second camera oriented in the direction; extracting, using processing circuitry, first feature information from the captured image; matching the first feature information and the second feature information; transforming a second local frame of reference of the second feature information to a first local frame of reference of the first feature information to determine a location of the external source; and determining if a collision with the external source will occur based on the location of the external source and a current flight trajectory.

In Example 14, the subject matter of Example 13 includes, wherein the method further comprising altering the current flight trajectory of the drone based on the determining a collision with the external source will occur.

In Example 15, the subject matter of Examples 13-14 includes, wherein the external source is a second drone.

In Example 16, the subject matter of Examples 13-15 includes, wherein the external source is a stationary object.

In Example 17, the subject matter of Examples 13-16 includes, broadcasting, using a transmitter, the first feature information.

In Example 18, the subject matter of Examples 13-17 includes, receiving a location of a third source, the third source not having overlapping features with the first feature information; determining a collision with the third source will occur based on the location of the third source and the current flight trajectory; and altering the current flight trajectory based on the determining the collision with the third source will occur.

In Example 19, the subject matter of Examples 13-18 includes, receiving trajectory information of the external source from the external source.

In Example 20, the subject matter of Example 19 includes, determining a relative velocity of the external source based on the trajectory information of the external source; determining a virtual force based on the relative velocity of the external source; adding the virtual force to a position based on the current flight trajectory to create an attitude controller input; and providing the attitude controller input to an attitude controller, wherein the virtual force changes acceleration of the drone from an acceleration of the current flight trajectory.

In Example 21, the subject matter of Examples 19-20 includes, receiving external source priority information from the external source, and wherein the determining if a collision with the external source will occur comprises: determining an observation sphere of the external source based on the location of the external source; determining a collision sphere of the drone based on a current location of the drone; determining the observation sphere of the external source intersects the collision sphere of the drone; aligning current flight trajectory and the flight trajectory of the external source based on the intersection of the observation sphere of the external source and the collision sphere of the drone; and determining a collision between the drone and the external source will occur based on an intersection of the aligned trajectories.

In Example 22, the subject matter of Examples 19-21 includes, wherein the determining if a collision with the external source will occur comprises: determining first locations of the drone based on the current flight based on the current flight trajectory for a plurality of time points; determining second locations of the external source based on the trajectory information of the external source for the plurality of time points; determining a collision will occur if paths between consecutive points from the first locations and the second locations cross at a same time point.

In Example 23, the subject matter of Examples 13-22 includes, wherein the direction is upward.

In Example 24, the subject matter of Examples 13-23 includes, wherein the direction is downward.

Example 25 is at least one computer-readable medium for a drone collision avoidance comprising instructions which when executed by a machine, cause the machine to perform operations: capturing an image of an environment, wherein the camera is oriented in a direction; receiving second feature information from a external source, wherein the second feature information is extracted from a second image of the environment captured by a second camera oriented in the direction; extracting first feature information from the captured image; matching the first feature information and the second feature information; transforming a second local frame of reference of the second feature information to a first local frame of reference of the first feature information to determine a location of the external source; and determining if a collision with the external source will occur based on the location of the external source and a current flight trajectory.

In Example 26, the subject matter of Example 25 includes, wherein the instructions further comprise altering the current flight trajectory of the drone based on determining a collision with the external source will occur.

In Example 27, the subject matter of Examples 25-26 includes, wherein the external source is a second drone.

In Example 28, the subject matter of Examples 25-27 includes, wherein the external source is a stationary object.

In Example 29, the subject matter of Examples 25-28 includes, wherein the instructions further comprise broadcasting, using a transmitter, the first feature information.

In Example 30, the subject matter of Examples 25-29 includes, wherein the instructions further comprise: receiving a location of a third source, the third source not having overlapping features with the first feature information; determining a collision with the third source will occur based on the location of the third source and the current flight trajectory; and altering the current flight trajectory based on the determining the collision with the third source will occur.

In Example 31, the subject matter of Examples 25-30 includes, wherein the instructions further comprise receiving trajectory information of the external source from the external source.

In Example 32, the subject matter of Examples 30-31 includes, wherein the instructions further comprise: determining a relative velocity of the external source based on the trajectory information of the external source; determining a virtual force based on the relative velocity of the external source; adding the virtual force to a position based on the current flight trajectory to create an attitude controller input; and providing the attitude controller input to an attitude controller, wherein the virtual force changes acceleration of the drone from an acceleration of the current flight trajectory.

In Example 33, the subject matter of Examples 30-32 includes, wherein the instructions further comprise receiving external source priority information from the external source, and wherein the instructions for determining if a collision with the external source will occur comprises: determining an observation sphere of the external source based on the location of the external source; determining a collision sphere of the drone based on a current location of the drone; determining the observation sphere of the external source intersects the collision sphere of the drone; aligning current flight trajectory and the flight trajectory of the external source based on the intersection of the observation sphere of the external source and the collision sphere of the drone; and determining a collision between the drone and the external source will occur based on an intersection of the aligned trajectories.

In Example 34, the subject matter of Examples 30-33 includes, wherein the instructions for determining if a collision with the external source will occur comprises: determining first locations of the drone based on the current flight based on the current flight trajectory for a plurality of time points; determining second locations of the external source based on the trajectory information of the external source for the plurality of time points; determining a collision will occur if paths between consecutive points from the first locations and the second locations cross at a same time point.

In Example 35, the subject matter of Examples 25-34 includes, wherein the direction is upward.

In Example 36, the subject matter of Examples 25-35 includes, wherein the direction is downward.

Example 37 is an apparatus for a drone collision avoidance, the apparatus comprising: means for capturing an image of an environment, wherein the camera is oriented in a direction; means for receiving second feature information from a external source, wherein the second feature information is extracted from a second image of the environment captured by a second camera oriented in the direction; means for extracting first feature information from the captured image; means for matching the first feature information and the second feature information; means for transforming a second local frame of reference of the second feature information to a first local frame of reference of the first feature information to determine a location of the external source; and means for determining if a collision with the external source will occur based on the location of the external source and a current flight trajectory.

In Example 38, the subject matter of Example 37 includes, means for altering the current flight trajectory of the drone based on determining a collision with the external source will occur.

In Example 39, the subject matter of Examples 37-38 includes, wherein the external source is a second drone.

In Example 40, the subject matter of Examples 37-39 includes, wherein the external source is a stationary object.

In Example 41, the subject matter of Examples 37-40 includes, means for broadcasting, using a transmitter, the first feature information.

In Example 42, the subject matter of Examples 37-41 includes, means for receiving a location of a third source, the third source not having overlapping features with the first feature information; means for determining a collision with the third source will occur based on the location of the third source and the current flight trajectory; and means for altering the current flight trajectory based on the determining the collision with the third source will occur.

In Example 43, the subject matter of Examples 37-42 includes, means for receiving trajectory information of the external source from the external source.

In Example 44, the subject matter of Example 43 includes, means for determining a relative velocity of the external source based on the trajectory information of the external source; means for determining a virtual force based on the relative velocity of the external source; means for adding the virtual force to a position based on the current flight trajectory to create an attitude controller input; and means for providing the attitude controller input to an attitude controller, wherein the virtual force changes acceleration of the drone from an acceleration of the current flight trajectory.

In Example 45, the subject matter of Examples 43-44 includes, means for receiving external source priority information from the external source, and wherein the means for determining if a collision with the external source will occur comprises: means for determining an observation sphere of the external source based on the location of the external source; means for determining a collision sphere of the drone based on a current location of the drone; means for determining the observation sphere of the external source intersects the collision sphere of the drone; means for aligning current flight trajectory and the flight trajectory of the external source based on the intersection of the observation sphere of the external source and the collision sphere of the drone; and means for determining a collision between the drone and the external source will occur based on an intersection of the aligned trajectories.

In Example 46, the subject matter of Examples 43-45 includes, wherein the means for determining if a collision with the external source will occur comprises: means for determining first locations of the drone based on the current flight based on the current flight trajectory for a plurality of time points; means for determining second locations of the external source based on the trajectory information of the external source for the plurality of time points; means for determining a collision will occur if paths between consecutive points from the first locations and the second locations cross at a same time point.

In Example 47, the subject matter of Examples 37-46 includes, wherein the direction is upward.

In Example 48, the subject matter of Examples 37-47 includes, wherein the direction is downward.

Example 49 is at least one machine-readable medium including instructions, which when executed by a machine, cause the machine to perform operations of any of the operations of Examples 13-24.

Example 50 is an apparatus comprising means for performing any of the operations of Examples 13-24.

Example 51 is at least one machine-readable medium including instructions that, when executed by processing circuitry, cause the processing circuitry to perform operations to implement of any of Examples 1-50.

Example 52 is an apparatus comprising means to implement of any of Examples 1-50.

Example 53 is a system to implement of any of Examples 1-50.

Example 54 is a method to implement of any of Examples 1-50.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document, for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. An apparatus for a drone collision avoidance, the apparatus comprising:
    processing circuitry to:
        extract first feature information from an image, the image captured from a first camera oriented in a direction;
        receive second feature information from an external source, wherein the second feature information is extracted from a second image of the environment captured by a second camera oriented in the direction;
        match the first feature information and the second feature information;
        transform a second local frame of reference of the second feature information to a first local frame of reference of the first feature information to determine a location of the external source;
        determine if a collision with the external source will occur based on the location of the external source and a current flight trajectory;
        receive a location of a third source, the third source not having overlapping features with the first feature information;
        determine if a collision with the third source will occur based on the location of the third source and the current flight trajectory; and
        alter the current flight trajectory based on the determination that the collision with the third source will occur.

2. The apparatus of claim 1, wherein a collision with the external source is determined and wherein the processing circuitry is further configured to alter the current flight trajectory based on the collision.

3. The apparatus of claim 1, wherein the external source is a second drone.

4. The apparatus of claim 1, wherein the external source is a stationary object.

5. The apparatus of claim 1, further comprising a transmitter to broadcast the first feature information.

6. The apparatus of claim 1, wherein the processing circuitry is further configured to receive trajectory information of the external source from the external source.

7. The apparatus of claim 6, wherein the processing circuitry is further configured to:
    determine a relative velocity of the external source based on the trajectory information of the external source;
    determine a virtual force based on the relative velocity of the external source;
    add the virtual force to a position based on the current flight trajectory to create an attitude controller input; and
    provide the attitude controller input to an attitude controller, wherein the virtual force changes acceleration of the drone from an acceleration of the current flight trajectory.

8. The apparatus of claim 6, wherein the processing circuitry is further configured to receive external source priority information from the external source, and wherein to determine if a collision with the external source will occur the processing circuitry is configured to:
    determine an observation sphere of the external source based on the location of the external source;
    determine a collision sphere of the drone based on a current location of the drone;
    determine the observation sphere of the external source intersects the collision sphere of the drone;
    align current flight trajectory and the flight trajectory of the external source based on the intersection of the observation sphere of the external source and the collision sphere of the drone; and
    determine a collision between the drone and the external source will occur based on an intersection of the aligned trajectories.

9. The apparatus of claim 6, wherein to determine if a collision with the external source will occur the processing circuitry is configured to:
    determine first locations of the drone based on the current flight based on the current flight trajectory for a plurality of time points;
    determine second locations of the external source based on the trajectory information of the external source for the plurality of time points; and
    determine a collision will occur if paths between consecutive points from the first locations and the second locations cross at a same time point.

10. The apparatus of claim 1, wherein the direction is upward.

11. The apparatus of claim 1, wherein the direction is downward.

12. A machine-implemented method for a drone collision avoidance, the method comprising:
    capturing, using a camera, an image of an environment, wherein the camera is oriented in a direction;
    receiving, using a receiver, second feature information from an external source, wherein the second feature information is extracted from a second image of the environment captured by a second camera oriented in the direction;
    extracting, using processing circuitry, first feature information from the captured image;
    matching the first feature information and the second feature information;
    transforming a second local frame of reference of the second feature information to a first local frame of reference of the first feature information to determine a location of the external source; and determining if a collision with the external source will occur based on the location of the external source and a current flight trajectory;

receiving a location of a third source, the third source not having overlapping features with the first feature information;

determining if a collision with the third source will occur based on the location of the third source and the current flight trajectory; and altering the current flight trajectory based on the determining the collision with the third source will occur.

13. The method of claim 12, wherein the method further comprising altering the current flight trajectory of the drone based on the determining a collision with the external source will occur.

14. The method of claim 12, wherein the external source is a second drone.

15. The method of claim 12, wherein the external source is a stationary object.

16. The method of claim 12, further comprising broadcasting, using a transmitter, the first feature information.

17. The method of claim 12, further comprising receiving trajectory information of the external source from the external source.

18. The method of claim 17, further comprising:
determining a relative velocity of the external source based on the trajectory information of the external source;
determining a virtual force based on the relative velocity of the external source;
adding the virtual force to a position based on the current flight trajectory to create an attitude controller input; and
providing the attitude controller input to an attitude controller, wherein the virtual force changes acceleration of the drone from an acceleration of the current flight trajectory.

19. The method of claim 17, further comprising receiving external source priority information from the external source, and wherein the determining if a collision with the external source will occur comprises:
determining an observation sphere of the external source based on the location of the external source;
determining a collision sphere of the drone based on a current location of the drone;
determining the observation sphere of the external source intersects the collision sphere of the drone;
aligning current flight trajectory and the flight trajectory of the external source based on the intersection of the observation sphere of the external source and the collision sphere of the drone; and
determining a collision between the drone and the external source will occur based on an intersection of the aligned trajectories.

20. The method of claim 17, wherein the determining if a collision with the external source will occur comprises:
determining first locations of the drone based on the current flight based on the current flight trajectory for a plurality of time points;
determining second locations of the external source based on the trajectory information of the external source for the plurality of time points;
determining a collision will occur if paths between consecutive points from the first locations and the second locations cross at a same time point.

21. The method of claim 12, wherein the direction is downward.

22. At least one non-transitory computer-readable medium for a drone collision avoidance comprising instructions which when executed by a machine, cause the machine to perform operations comprising:
capturing an image of an environment, wherein the camera is oriented in a direction;
receiving second feature information from a external source, wherein the second feature information is extracted from a second image of the environment captured by a second camera oriented in the direction;
extracting first feature information from the captured image;
matching the first feature information and the second feature information;
transforming a second local frame of reference of the second feature information to a first local frame of reference of the first feature information to determine a location of the external source;
determining if a collision with the external source will occur based on the location of the external source and a current flight trajectory;
receiving a location of a third source, the third source not having overlapping features with the first feature information;
determining if a collision with the third source will occur based on the location of the third source and the current flight trajectory; and
altering the current flight trajectory based on the determining the collision with the third source will occur.

23. The at least one non-transitory computer-readable medium of claim 22, wherein the instructions further comprise altering the current flight trajectory of the drone based on determining a collision with the external source will occur.

24. An apparatus for a drone collision avoidance, the apparatus comprising:
processing circuitry to:
extract first feature information from an image, the image captured from a first camera oriented in a direction;
receive second feature information from an external source, wherein the second feature information is extracted from a second image of the environment captured by a second camera oriented in the direction;
match the first feature information and the second feature information;
transform a second local frame of reference of the second feature information to a first local frame of reference of the first feature information to determine a location of the external source;
determine if a collision with the external source will occur based on the location of the external source and a current flight trajectory;
receive trajectory information of the external source from the external source;
determine a relative velocity of the external source based on the trajectory information of the external source;
determine a virtual force based on the relative velocity of the external source;
add the virtual force to a position based on the current flight trajectory to create an attitude controller input; and provide the attitude controller input to an attitude controller, wherein the virtual force changes acceleration of the drone from an acceleration of the current flight trajectory.

25. An apparatus for a drone collision avoidance, the apparatus comprising:
processing circuitry to:
extract first feature information from an image, the image captured from a first camera oriented in a direction;
receive second feature information from an external source, wherein the second feature information is extracted from a second image of the environment captured by a second camera oriented in the direction;
match the first feature information and the second feature information;
transform a second local frame of reference of the second feature information to a first local frame of reference of the first feature information to determine a location of the external source;
determine if a collision with the external source will occur based on the location of the external source and a current flight trajectory;
receive flight trajectory of the external source from the external source; and
receive external source priority information from the external source,
wherein to determine if a collision with the external source will occur, the processing circuitry is configured to:
determine an observation sphere of the external source based on the location of the external source;
determine a collision sphere of the drone based on a current location of the drone;
determine the observation sphere of the external source intersects the collision sphere of the drone;
align current flight trajectory and the flight trajectory of the external source based on the intersection of the observation sphere of the external source and the collision sphere of the drone; and
determine a collision between the drone and the external source will occur based on an intersection of the aligned trajectories.

26. An apparatus for a drone collision avoidance, the apparatus comprising:
processing circuitry to:
extract first feature information from an image, the image captured from a first camera oriented in a direction;
receive second feature information from an external source, wherein the second feature information is extracted from a second image of the environment captured by a second camera oriented in the direction;
match the first feature information and the second feature information;
transform a second local frame of reference of the second feature information to a first local frame of reference of the first feature information to determine a location of the external source;
determine if a collision with the external source will occur based on the location of the external source and a current flight trajectory; and
receive trajectory information of the external source from the external source,
wherein to determine if a collision with the external source will occur, the processing circuitry is configured to:
determine first locations of the drone in the current flight based on the current flight trajectory for a plurality of time points;
determine second locations of the external source based on the trajectory information of the external source for the plurality of time points; and
determine if a collision will occur if paths between consecutive points from the first locations and the second locations cross at a same time point.

* * * * *